United States Patent [19]

Suzuki

[11] Patent Number: 5,724,579
[45] Date of Patent: Mar. 3, 1998

[54] SUBORDINATE IMAGE PROCESSING APPARATUS

[75] Inventor: Takeshi Suzuki, Hachiohji, Japan

[73] Assignee: Olympus Optical Co., Ltd., Tokyo, Japan

[21] Appl. No.: 399,336

[22] Filed: Mar. 6, 1995

[30] Foreign Application Priority Data

Mar. 4, 1994 [JP] Japan .................................. 6-059884

[51] Int. Cl.$^6$ ............................................. G06F 17/30
[52] U.S. Cl. .......................... 395/615; 382/305; 382/282; 358/403; 358/453
[58] Field of Search .................................. 350/403, 404, 350/444, 426, 432; 382/305, 248, 250; 364/715.02, 225.4, 413.13; 395/600

[56] References Cited

U.S. PATENT DOCUMENTS

| 4,602,333 | 7/1986 | Komori | 364/413.13 |
| 4,931,984 | 6/1990 | Ny | 364/600 |
| 4,992,887 | 2/1991 | Aragaki | 358/403 |
| 5,129,011 | 7/1992 | Nishikawa et al. | 364/225.4 |
| 5,165,103 | 11/1992 | Takeda et al. | 364/715.02 |

Primary Examiner—Scott A. Rogers
Attorney, Agent, or Firm—Cushman, Darby & Cushman IP Group of Pillsbury, Madison & Sutro LLP

[57] ABSTRACT

Subordinate images are produced by extracting parts of photographically obtained or externally supplied main image data of a predetermined image area for improving retrieval properties. First, subordinate image is produced by extracting part of photographically obtained or externally supplied main image data of a predetermined image area, and a second subordinate image is produced by extracting part of the image data of the first subordinate image produced by the first subordinate image producing means. Thus, the subordinate image can be produced from subordinate image data, increasing the freedom degree of the subordinate image production, and it is possible to extract only the necessary data.

10 Claims, 32 Drawing Sheets

(A)

(B)

(C)

(A)

(B)

(C)

PICTURE IN PICTURE

CHARACTER DISPLAY

SUBORDINATE IMAGE PROCESSING APPARATUS

BACKGROUND OF THE INVENTION

The present invention relates to image processing apparatuses and, more particularly, to an image processing apparatus with improved retrieval and operation control properties.

Digital still cameras are capable of recording, as files, image data, voice data, control data, etc. on such recording media as IC memory cards, magnetic media (hard disks or floppy disks), opto-magnetic media, etc.

In digital still cameras, or like image processing apparatuses, an image can be obtained in the form of image data for use in computer processing or image data transfer. Thus, expansion of the use of such apparatus is expected. In such image processing apparatus, image data is recorded as frame data, that is, as data for one frame and is stored in IC cards or like recording media. This means that for retrieval of the recorded image it is necessary to read out and reproduce individual image data successively. In general, however, the quantity of the image data to be handled is large and, particularly, in the case of floppy disks or the like, where the data read speed is low, considerable time is required for reading and reproducing the data. Meanwhile, it is well known in the art to use data compression for data quantity reduction. For image reproduction, however, the read-out individual image data pieces have to be subjected to a decompression process which dictates a long time for the reproducing process thereby making it difficult to obtain high speed retrieval.

SUMMARY OF THE INVENTION

An object of the invention, therefore, is to provide an image processing apparatus capable of high speed retrieval of data while improving operation control.

According to one aspect of the present invention, there is provided an image processing apparatus comprising subordinate image producing means for producing subordinate image data by extracting a portion of photographically obtained or externally supplied main image data of a predetermined image area, and means for storing the main image data and the subordinate image data in the same file. Thus, the retrieval operation can be greatly improved.

According to another aspect of the present invention, there is provided an image processing apparatus comprising first subordinate image producing means for producing first subordinate image data by extracting a portion of photographically obtained or externally supplied main image data of a predetermined image area, a second subordinate image producing means for producing second subordinate image data by extracting a portion of the first subordinate image data generated by the first subordinate image producing means, and means for storing the main image data and the first and second subordinate image data in the same file. Thus, the subordinate image can be produced from subordinate image data, increasing the freedom degree of the subordinate image production, and it is possible to extract only the necessary data.

Here, the subordinate image producing means includes area selecting means for selecting a particular area data of the main image as the part of image data, thus unnecessary data can be deleted to improve retrieval properties. The area selection means includes at least either size changing means for changing the size of the particular area and area position changing means for changing the position of the particular area. Further production of the subordinate image from the subordinate image data permits more flexible area selection as well as increasing the freedom degree of the subordinate image generation and permitting extraction of only necessary data. The subordinate image producing means includes image contracting means for contracting the image data and making the contracted image data to be the part of image data, thereby making it possible to have knowledge of the whole image with smaller data size, thus providing for retrieval property improvements. The subordinate image producing means includes image compressing means for compressing the image data and making the compressed image data to be the part of image data, thus smaller data sizes can be obtained with substantially the same quality, thus providing for retrieval property improvements. The first subordinate image producing means includes first area selecting means for making a particular area data of the main image to be the part of image data, or first image contracting means for making contracted image data obtained through contraction of the main image to be the part of image data, and the second subordinate image producing means includes at least one means selected from second area selecting means for making a particular area data of the first subordinate image to be the part of image data, second image contracting means for making contracted image data obtained through contraction of the first subordinate image to be the part of image data, and image compressing means for making compressed image data obtained through contraction of data of the first subordinate image to be the part of image data. Thus, necessary data can be produced in reduced size, thus providing for retrieval property improvements.

The image compressing means includes means for producing AC and DC orthogonal coefficients through orthogonal transform of image data, and producing the subordinate image data based on the sole DC orthogonal coefficients. Compared to mere image contraction, the image quality can be improved, the hardware can be simplified, and the retrieval property can be improved.

The image compressing means executes the compression with setting a constant data quantity after the compression. Thus, the subordinate image data quantity may be constant, thus permitting ready address management and providing retrieval property improvement. The image compressing means executes the compression with setting a constant compression factor. Thus, it becomes possible to provide a constant image quality and the image record can be obtained without any trouble by taking any picture, while providing for retrieval property improvements.

According to another aspect of the present invention, there is provided an image processing apparatus comprising means for producing data of main image data of photographically obtained or externally supplied image of a predetermined area and subordinate image data constituted by part of image data of the main image and recording the subordinate-image data after the main image data recorded in the same file. When recording the main and subordinate image data in the same file, writing the main image data first is convenient in case of adding the subordinate image or erasing only the subordinate image. Besides, since the main image is in the forefront, it can be reproduced when the reproduction is made by using general software for personal computers.

The subordinate image producing means includes data format means for converting produced subordinate image data into format data conforming to the format of a relevant computer, making it possible to handle data more simply and at higher speeds in personal computers, as well as providing for retrieval property improvements.

According to still another aspect of the present invention, there is provided an image processing apparatus means for producing subordinate image by extracting part of the main image data of a photographically obtained or externally supplied image of a predetermined area, and means for writing produced subordinate image data in a data recording section of a main image file having a file header and writing a write start address of the subordinate image in the file header. Since the relational file is common to both main and subordinate images, both the images can be handled together at the time of movement, copying, deleting, etc., and it is possible to obtain conventional frame No. management.

According to a further aspect of the present invention, there is provided an image processing apparatus comprising means for producing a subordinate image by extracting part of the main image data of photographically obtained or externally supplied image of a predetermined area, and means for writing produced subordinate image data in an image file having a file header by interpreting tuple data recorded in the file header, producing an option tuple for each subordinate image, and writing parameters or data or the parameters and the data of the subordinate data in the produced option tuple. When recording the main and subordinate image data in the same file, writing the main image first is convenient in case of adding a subordinate image or erasing only the subordinate image, as well as permitting reproduction of the main image in general personal computer software or the like because the main image is in the forefront. Besides, by deleting the file header, only the main image remains, which is convenient for extracting the main image.

According to a still further aspect of the present invention, there is provided an image processing apparatus comprising means for producing subordinate image by extracting part of the main image data of photographically obtained or externally supplied image of a predetermined area, means for converting data of the main image data into data of format conforming to an image data format for a personal computer, and means for writing produced subordinate image data in an image header section or a data section for each converted main image data by interpreting data recorded in the image header section and writing data of the subordinate image in the image header section or the data section. The configuration of a single image header for one image can be made use of, in the case where there are a plurality of main image records in the same file, for prescribing subordinate images for each of these main images.

According to still another aspect of the present invention, there is provided an image processing apparatus comprising subordinate image producing means for producing subordinate image constituted by part of the main image data of each of a plurality of pieces of main image constituted by photographically obtained or externally supplied image of a predetermined area, and means for recording data of the main image and a plurality of subordinate image data in respective separate image files, thus with a single record of image in a file, image management is possible with file image.

According to still another aspect of the present invention, there is provided an image processing apparatus comprising subordinate image producing means for producing a subordinate image constituted by part of the main image data of each of a plurality of pieces of main image constituted by photographically obtained or externally supplied image of a predetermined area, and means for recording data of the main image and data of a plurality of pieces of subordinate image in respective separate image files and recording relational data about the main and subordinate image data in a relational data file as a specific data file. Since the relational data is provided collectively, it can be simply managed.

According to another aspect of the present invention, there is provided an image processing apparatus comprising subordinate image producing means for producing a subordinate image constituted by part of the main image data of each of a plurality of pieces of a main image constituted by a photographically obtained or externally supplied image of a predetermined area, and means for recording data of the main image and data of a plurality of pieces of produced subordinate image in respective separate image files and recording relational data between the main image data and the subordinate image data in file headers of image files with the main image data recorded thereon. Since retrieval can be made in a relational fashion, such as from the main image to the subordinate image and also from the subordinate image to the main image, it can be made at high speed without the need of reading any excess files.

According to a further aspect of the present invention, there is provided an image processing apparatus comprising subordinate image producing means for producing a subordinate image constituted by part of the main image data of each of a plurality of pieces of main image constituted by a photographically obtained or externally supplied image of a predetermined area, and means for recording data of the main image and data of a plurality of pieces of produced subordinate image in respective separate image files and recording the data of the plurality of subordinate images based on the main image data together with file names or file names and extenders for discriminating these image pieces from one another. Thus, only the main or subordinate image can be reproduced more simply. Besides, discrimination of the main and subordinate images may be made from their names. These names also permit the relation of the images to be determined. Thus, it is possible to obtain management of images without reproduction thereof.

According to a still further aspect of the present invention, there is provided an image processing apparatus comprising subordinate image producing means for producing a subordinate image constituted by part of the main image data of each of a plurality of pieces of main image constituted by a photographically obtained or externally supplied image of a predetermined area, and means for recording data of the main image and data of a plurality of pieces of produced subordinate image in respective separate image files and recording at least the subordinate image data among the main and subordinate image data in directories capable of being discriminated from one another. The main or subordinate image can thus be reproduced conveniently. Particularly, the reproduction of solely the subordinate image is effective at the time of the index reproduction.

According to another aspect of the present invention, there is provided an image processing apparatus comprising subordinate image producing means for producing subordinate image constituted by part of the main image data of each of a plurality of pieces of main image constituted by a photographically obtained or externally supplied image of a predetermined area, and means for recording data of the main image and data of a plurality of pieces of produced subordinate image in respective separate image files and collectively recording at least the subordinate image data among the main and subordinate image data in a single image file. This is effective for collecting image erasing.

According to still another aspect of the present invention, there is provided an image processing apparatus capable of obtaining a plurality of main images each constituted by a predetermined area image continuously at a predetermined interval, comprising subordinate image producing means for producing a subordinate image constituted by part of the main image data of a particular one of the plurality of continuously obtained main images. Since the continuous image pick-up produces a series of similar images, volume saving can be attained by producing a subordinate image with respect to typical records of the image.

Here, the particular main image is the first or last one of the plurality of main images. Thus subordinate image production may be made only once, thus permitting higher speed continuous image pickup. Besides, since the relational data is provided collectively, it is possible to obtain simple management and conventional frame No. management. The particular main image is selected according to the length of the predetermined interval, the shorter or the longer the predetermined interval being, the greater or the less the number of main images being. When the speed of the continuous image pick-up is slow, time is redundant, and it is possible to reduce the subordinate image generation interval and produce the subordinate image by appropriately utilizing idle time.

According to another aspect of the present invention, there is provided an image processing apparatus comprising means for producing a main image constituted by a photographically obtained or externally supplied image of a predetermined area and subordinate image constituted by part of the image data of the main image, existence information of the corresponding subordinate image being displayed when the main image is reobtained or displayed. If it is possible to display information about whether there is a subordinate image when reproducing the main image, the convenience of use can be improved.

According to a further aspect of the present invention, there is provided an image processing apparatus comprising means for producing a main image constituted by a photographically obtained or externally supplied image of a predetermined area and subordinate area constituted by part of the image data of the main image, the means producing a plurality of pieces of corresponding subordinate image when the main image is reproduced and displayed. Thus, it is possible to produce the subordinate image while watching the reproduced image. Thus, higher freedom degree of the subordinate image production can be obtained.

According to a still further aspect of the present invention, there is provided an image processing apparatus comprising storage means for storing data of the main image constituted by a photographically obtained or externally supplied image of a predetermined area and data of a subordinate image constituted by part of the image data of the main image, and means for erasing the only particular subordinate image data stored in the storage means. Since only the subordinate image can be erased, it is possible to erase an unnecessary subordinate image or produce the subordinate image afresh.

According to a further aspect of the present invention, there is provided an image processing apparatus comprising storage means for storing data of the main image constituted by a photographically obtained or externally supplied image of a predetermined area and data of a subordinate image constituted by part of the image data of the main image, and means for collectively erasing the data of a plurality of subordinate images stored in the storage means. Thus, it becomes possible to erase the subordinate image collectively, thus providing for improved convenience of use.

According to another aspect of the present invention, there is provided an image processing apparatus comprising storage means for storing data of the main image constituted by a photographically obtained or externally supplied image of a predetermined area and data of a subordinate image constituted by part of the image data of the main image, and means for collectively erasing the main image stored in the storage means and the subordinate image corresponding to the main image. Where the main and subordinate images are in separate files, erasing the main image automatically causes erasing of the subordinate image, thus providing for improved convenience of use.

According to still another aspect of the present invention, there is provided an image processing apparatus comprising subordinate image producing means for producing a subordinate image constituted by part of the main image data constituted by a photographically obtained or externally supplied image of a predetermined area, and transmitting means for transmitting the produced subordinate image data. The subordinate image is smaller in data size than the main image, which is convenient when transmitting data.

According to another aspect of the present invention, there is provided an image processing apparatus comprising subordinate image producing means for producing a subordinate image constituted by part of the main image data constituted by a photographically obtained or externally supplied image of a predetermined area, and transmitting means for transmitting the produced subordinate image data, main image data corresponding to the transmitted subordinate image being transmitted With reception and according to a response signal received from the receiving side which received the subordinate image data. By first transmitting the smaller size subordinate image and then transmitting the main image according to the desire of the receiving side, only the necessary image may be transmitted, which is a desired economy.

According to a further aspect of the present invention, there is provided an image processing apparatus comprising subordinate image producing means for producing a subordinate image constituted by part of the main image data constituted by a photographically obtained or externally supplied image of a predetermined area, and transmitting means for transmitting the produced subordinate image data, the subordinate image being produced and transmitted according to a subordinate image producing mode designated by a production mode designating signal received from the receiving side which received the subordinate image data. Since the receiving side may not always require all main image data, only necessary data may be transmitted, that is, only the subordinate image may be transmitted, which is produced according to the desire of the receiving side.

According to still a further aspect of the present invention, there is provided an image processing apparatus comprising subordinate image producing means for producing a subordinate image constituted by part of the image data of each of a plurality of main images constituted by a photographically obtained or externally supplied image of a predetermined area, data of the produced main or subordinate image being written in the same image file, write start address for each data being expressed as 2 (n being an integer). The independence of the image data itself is increased, thus increasing the versatility of individual data. Besides, convenience is provided for the extraction, erasing, etc. of solely the image data. Further the first address retrieval property is improved.

According to the individual aspects of the invention as noted above, corresponding ones of various functions to be described later are obtainable. That is, a part of the image data of the main image is extracted to produce subordinate image data, and the subordinate image data thus produced and the main image data are recorded in such a relation that they can be discriminated. Further, the recorded subordinate image is read out, reproduced or erased either solely or in relation to the main image. Furthermore, the produced subordinate image data is transmitted, and the main image data corresponding to the transmitted subordinate image is transmitted according to a response signal from the receiving side.

Other objects and features will be clarified from the following description with reference to attached drawings.

PREFERRED EMBODIMENTS OF THE INVENTION

An embodiment of the present invention will now be described with reference to the drawings.

Figure 1:
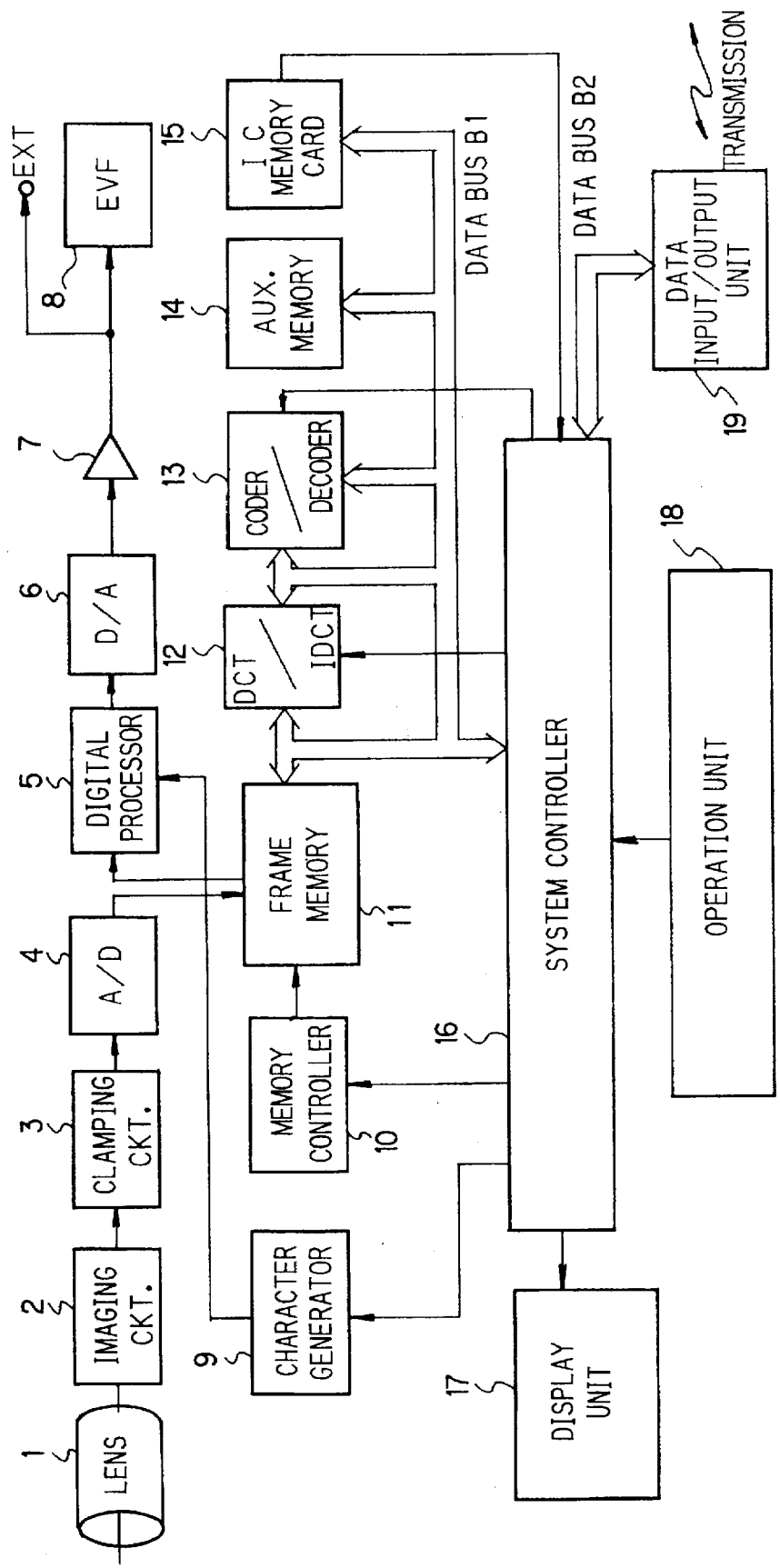
FIG. 1 shows a block diagram representing implementation of the image processing apparatus, according to the invention, as a digital still camera.

FIG. 1 is a block diagram showing implementation of the image processing apparatus, according to the invention, as a digital still camera.

An object to be photographed is inputted through an optical system (lens 1) to imaging circuit 2 having CCDs or the like imaging elements as photoelectric converting means to produce an electric signal. The electric signal thus obtained is subjected by clamping circuit 3 to a predetermined clamping process and then converted by A/D converter 4 into digital data to be written in frame memory 11. The writing and reading of the data in and out of frame memory 11 are controlled by memory controller 10 the under control of system controller 16. The image data read out from frame memory 11 is coupled to digital processor 5 for digital processing along with character data supplied from character generator 9. The output data from digital processor 5 is converted in D/A converter 6 into an analog image signal. The analog image signal is amplified by amplifier 7 and then supplied to external terminal EXT and electronic viewfinder 8.

In data recording, image data read out from frame memory 11 is subjected to orthogonal transform in DCT/IDCT (discrete cosine transform/inverse discrete cosine transform) circuit 12. The orthogonal coefficient data is coded in coder/decoder 13 and subjected to a compression process in a compression system conforming to the JPEG system, etc. The compressed image data is recorded in IC memory card 15 which is used as a storage means. IC memory card 15 may be detachably provided to the apparatus body, or it may be equipped therein.

The image data read out from IC memory card 15 is subjected to a decompression process in the coder/decoder 13 and the DCT/IDCT circuit 12 before being written in frame memory 11. The image data read out from frame memory 11 is supplied through digital processor 5, D/A converter 6 and amplifier 7 to external terminal EXT and electronic viewfinder 8.

The system controller 16 receives and outputs data through data bus B1 to control the entire camera operation. As an example, it controls the display on display unit 17 comprising LCDs or the like and also controls the camera operation according to operation data from operation unit 18. Further, it controls character generator 9 for desired character data output control, and also controls external communication via data bus B2 and data input/output unit 19. An auxiliary memory 14 is a working memory for various data processes.

Using the structure shown in FIG. 1, according to the embodiments of the present invention, the subordinate image (e.g., thinned image, contracted image, etc.) is produced by extracting part of the image data of one image frame (hereinafter referred to as the main image), the extracted image being stored in a memory, transmitted to a different image processing apparatus or otherwise being processed. The recording of the extracted or subordinate image in the memory is made through the operation of system controller 16, and there are various recording statuses which will be described hereinafter.

In the digital still camera, in which image data, voice data, control data, etc. are recorded as files on a recording medium, such as a memory card, a magnetic medium (a hard disk or a floppy disk), an opto-magnetic medium, etc., data may also be recorded in the form of a file on the recording medium. From the viewpoint of data versatility, it is desirable to use a personal computer or the like for memory management in the standard DOS (disk operating system) form. Also, there have been investigations to record the control data for such purposes as the controlling operation and relating the individual files to one another as control files or relational files (hereinafter referred to as relational files) on the recording medium.

A first recording status is such that the main and subordinate image data are recorded in the image file at the time of the recording in the file form.

Figure 2:
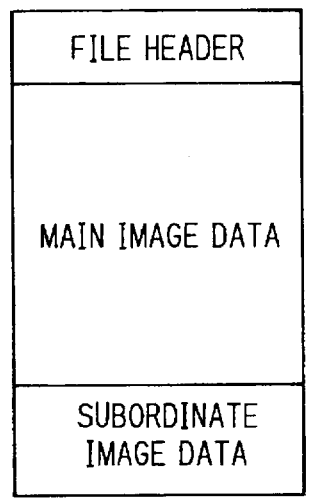
FIG. 2 shows three different examples of the recording status.
Figure 2:
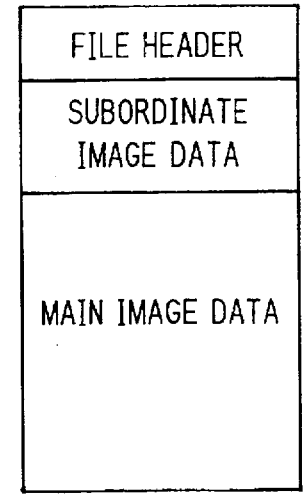
Figure 2:
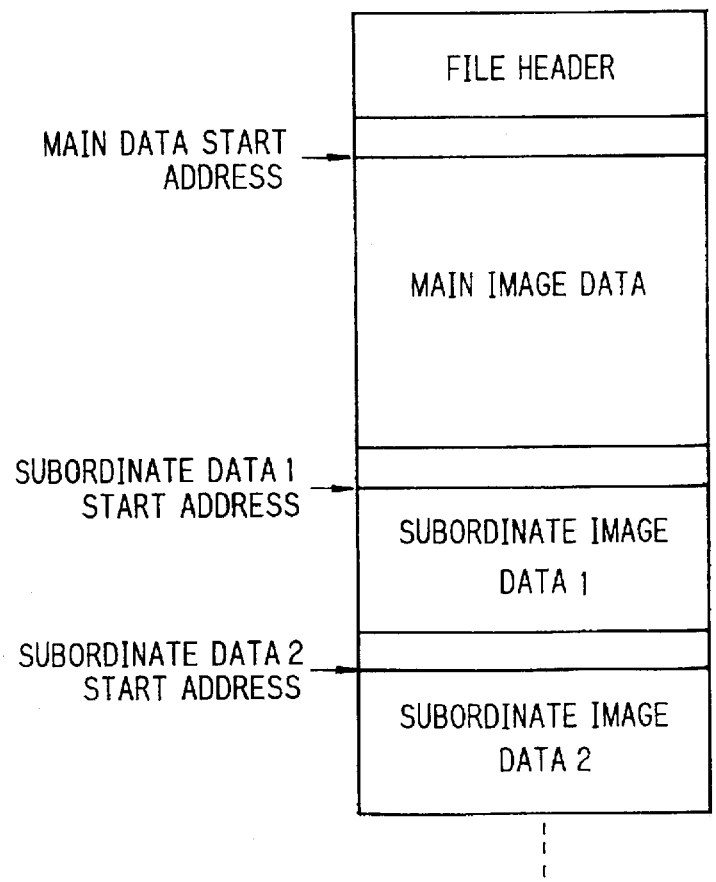

FIG. 2 shows three different examples of the recording status. Such recording into the image file permits frame No. management as in the prior art and handling of the main and subordinate images alike for moving, copying, deleting, etc.

In FIG. 2(A), when recording a single image data frame, a file header and main and subordinate image data are recorded successively in the mentioned order in an image file. Thus, it is possible to readily erase the sole subordinate image. In addition, when producing a plurality of subordinate images, it is possible to readily add data. Further, the main image can be readily reproduced. In FIG. 2(B), a file header and subordinate and main image data are recorded successively in the mentioned order. It is thus possible to realize quick retrieval in a subordinate image reproduction mode. In FIG. 2(C), there is shown a recording status for a plurality of subordinate images. In this case, after a file header, the main image data is written from a main data start address, then subordinate image data 1 is written from a subordinate image data 1 start address, and subordinate image data 2 is written from a subordinate data 2 start address.

Figure 3:
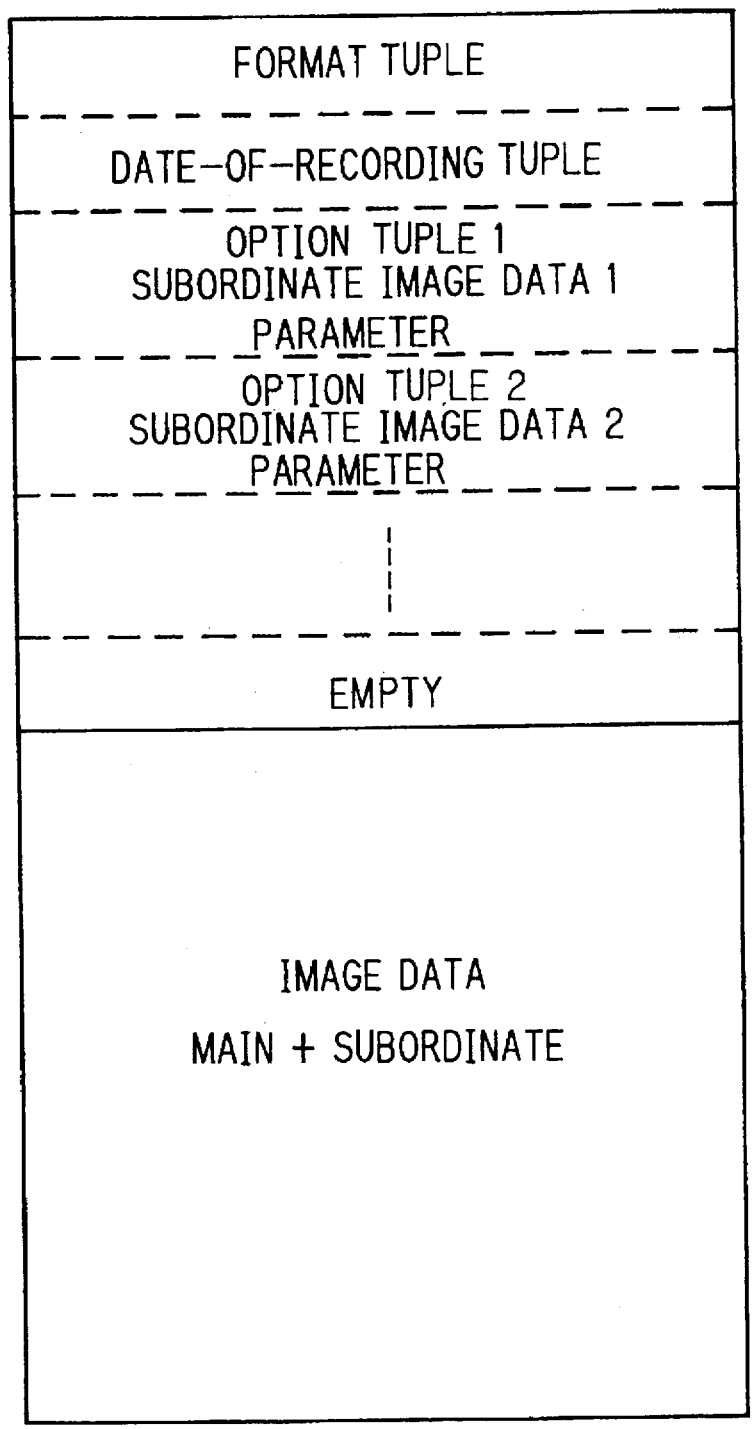
FIG. 3 shows an example of entry in the file header.

FIG. 3 shows an example of entry in the file header. As shown, a standardized format tuple and a date-of-recording tuple are first entered. Then, subordinate image data 1 parameter is given in option tuple 1, and then subordinate image data 2 parameter is given in option tuple 2. The image data, main and subordinate image data are then recorded continuously. The parameters of the subordinate image data may be the subordinate image data start address or the subordinate image data type (such as compressed or non-compressed information, pixel size, etc.). Further, it may be the contraction factor ½n with respect to the main image. When a contracted subordinate image is produced, it is simpler and requires less data to record the contraction factor alone than to record the pixel size as the parameters. Further, the date of production of the subordinate image data is provided. Thus, in addition to the effects described above, the sole main image can be readily extracted.

Figure 4:
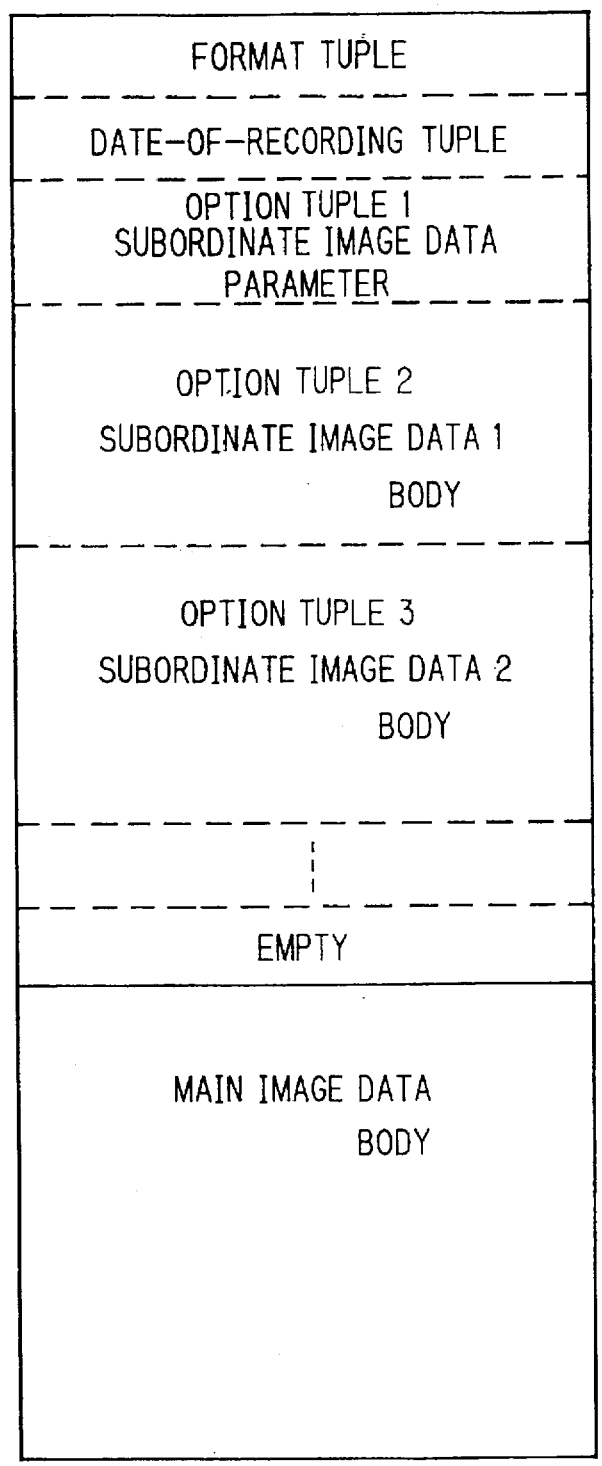
FIG. 4 shows an example of the recording format in the file header.

FIG. 4 shows an example of the recording format in the file header. In this case, after a format tuple and a date-of-recording tuple, parameters of the recorded subordinate image data are recorded in option tuple 1, the body of the subordinate image data is recorded in option tuple 2, and the body of the subordinate image data 2 is recorded in option tuple 3. The body of the main image data is recorded in other areas than the file header of the image file. The subordinate image data parameters may be the presence or absence of data, their quantity, type of the subordinate image data (such as compressed or non-compressed information, pixel size, contraction factor, etc.).

Figure 5:
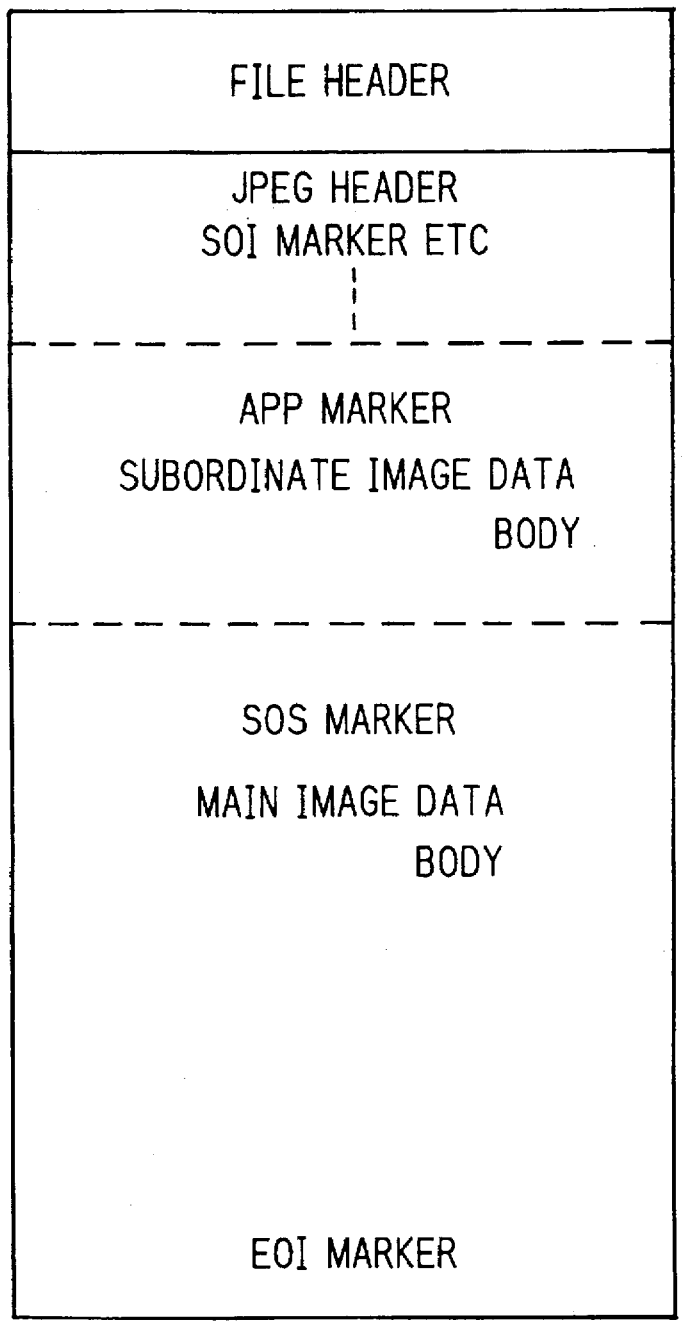
FIG. 5 shows an example of recording an image header (JPEG header) in the case of recording the main image data after compression thereof in JPEG standard format as the image data format system for personal computers.

FIG. 5 shows an example of recording an image header (JPEG header) in the case of recording the main image data after compression thereof in the JPEG standard image data format for personal computers.

As shown, after a file header, data of SOI (Start of Image), etc. is recorded in a JPEG header, then the body of the subordinate image data in an XPP (Application Marker) and the body of main image data in a SOS marker up to an EOI (End of Image) marker are recorded. With this arrangement, the same advantages as in the case of the example shown in FIG. 2 can be obtained. Image data formats available for personal computers include TIFF, PICT, BMP, etc. as well as JPEG, and the present invention is applicable to those systems as well.

Figure 6:
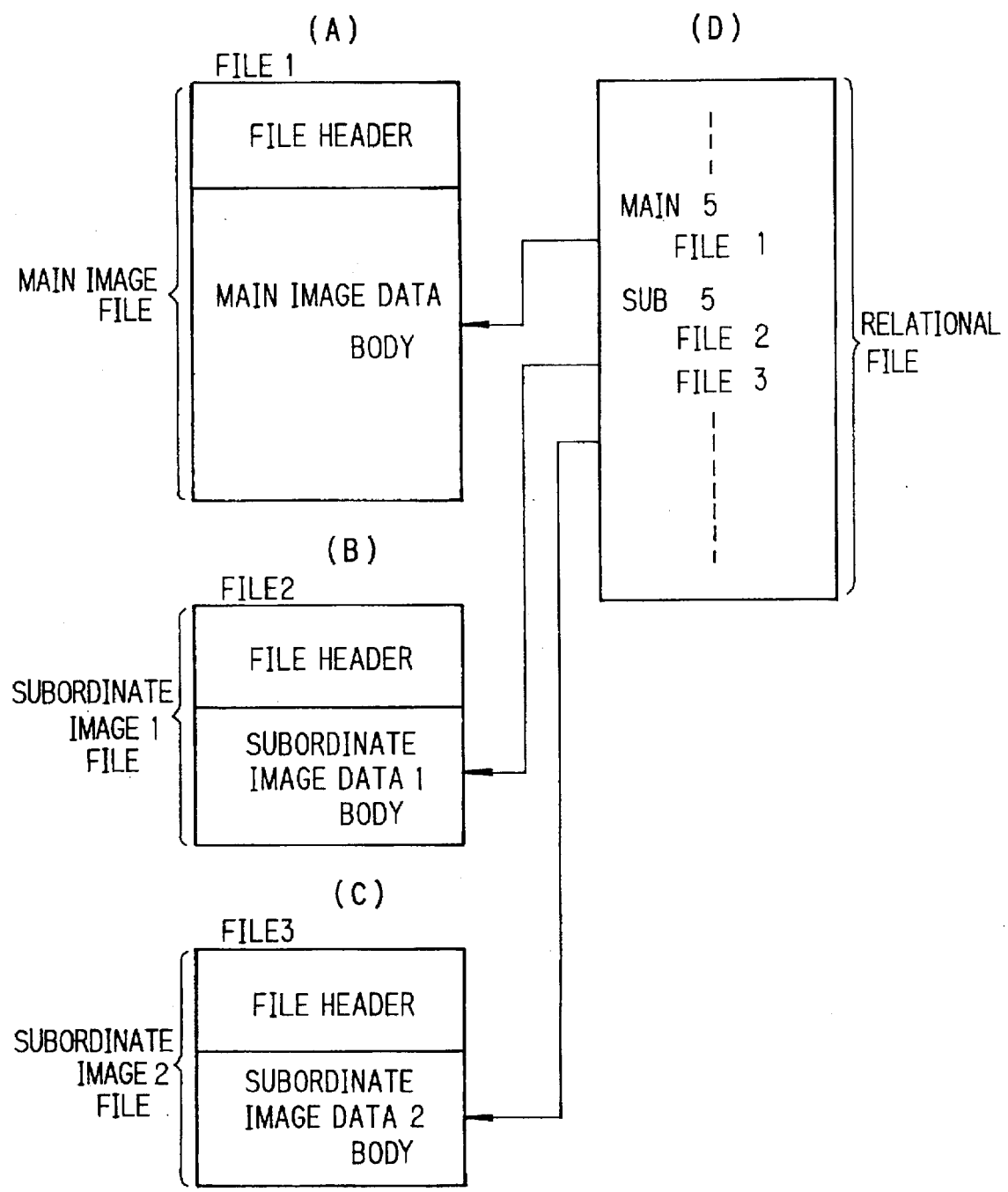
FIG. 6 shows an example of recording the subordinate image data in separate files from that of the main image data and recording relational data about the image data in the relational file.

FIG. 6 shows an example of recording the subordinate image data in separate files from that of the main image data and recording relational data about the image data in a relational file. With recording in separate files, a single frame of image is made to be a single file, and thus it is possible to permit image management with file management. By using the relational file, the relational data is managed collectively, thereby facilitating data management.

As shown in (A) in FIG. 6, a main image file which is constituted by a file header and the body of main image data is prepared as FILE 1. As shown in (B), subordinate image 1 file constituted by a file header and the body of subordinate image data 1 is prepared as FILE 2. As shown in (C), subordinate image 2 file constituted by a file header and the body of subordinate image 2 file is prepared as FILE 3. Further, the relational file is prepared as shown in (D). In the relational file shown in (D), "MAIN 5" indicates that the main image data in the fifth frame is recorded in FILE 1 in (A). Also, "SUB5" indicates that the subordinate image data in the fifth frame is recorded in FILES 2 and 3 shown in (B) and (C).

Figure 7:
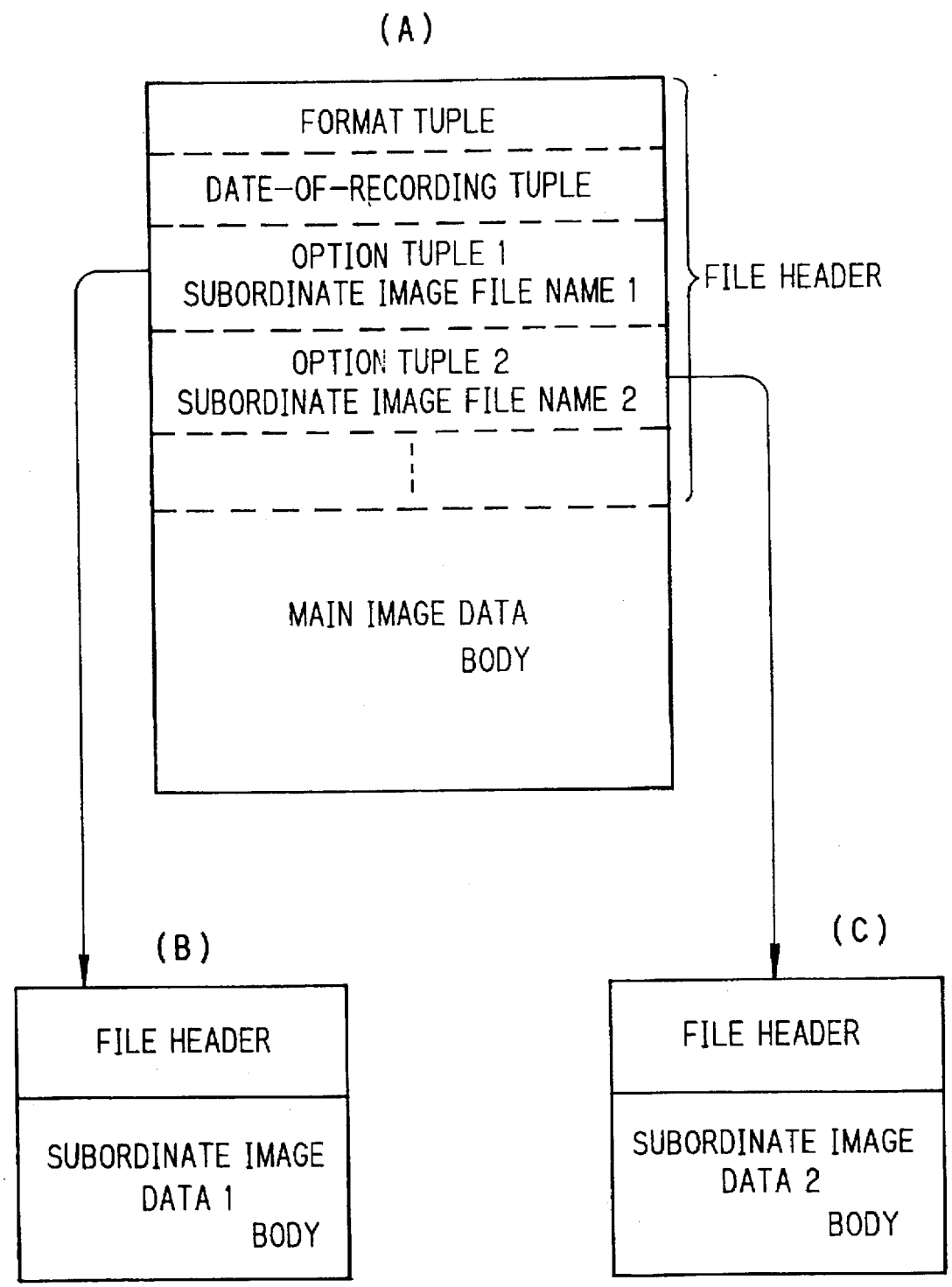
FIG. 7 shows an example of recording the subordinate image data in a separate file from that of the main image data and recording relational data about the subordinate image data files in the file header of main image data file.

FIG. 7 shows an example of recording subordinate image data in separate files from that of the main image data and recording relational data about the subordinate image data files in the file header of the main image data file (as shown in (A)). The file header includes option tuple 1, in which a format tuple, a date-of-recording tuple and subordinate image file name 1 are recorded, and option tuple 2 in which subordinate image file name 2 is recorded. Shown in (B) of FIG. 7 is the file in which the body of the subordinate image data 1 is recorded, and shown in (C) of FIG. 7 is the file in which the body of the subordinate image data 2 is recorded. According to this arrangement the subordinate image may be known by reading the main image. Further, by recording the relational data about the file headers of the subordinate image data and the main image data file, the relation with the main image can be known from the subordinate image without reading any excess files.

Figure 8:
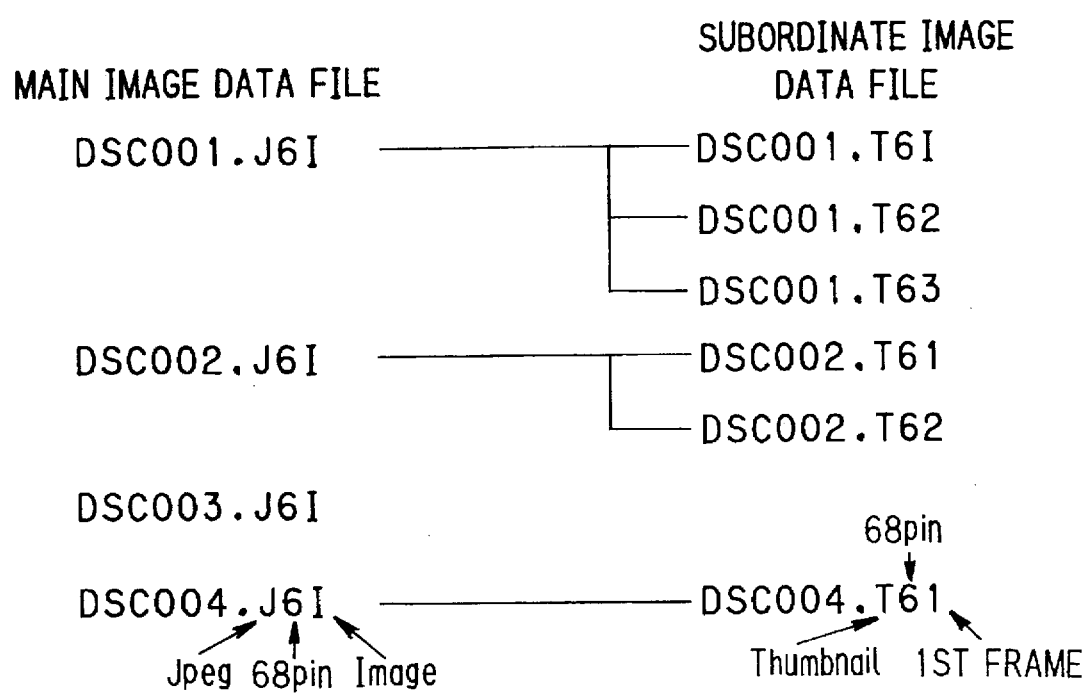
FIG. 8 shows an example, in which the main and subordinate image data are recorded in separate files for discriminating and relating of data on the basis of file names.

FIG. 8 shows an example, in which the main and subordinate image data are recorded in separate files for discriminating and relating the image data on the basis of file names. In this example, extenders are used to discriminate the main and subordinate image data files. Thus, the operation of reproducing solely the main or subordinate image may be readily executed. Further, since the file can be discriminated from the file name without reproducing the file image, image management based on file operation is possible to a certain extent.

Shown on the left side of FIG. 8 is an example of the main image data file with extender "J6I". In the extender "J6I", "J" represents JPEG as the compression system, "6" 68-pin, and "I" image.

Shown in the right side of FIG. 8 is an example of the subordinate image data file with extender "T6N" (N being a natural number). In the extender "T6N", "T" represents subordinate image data called "Thumbnail", "6" 68-pin, and "N" subordinate image data frame No.

Figure 9:
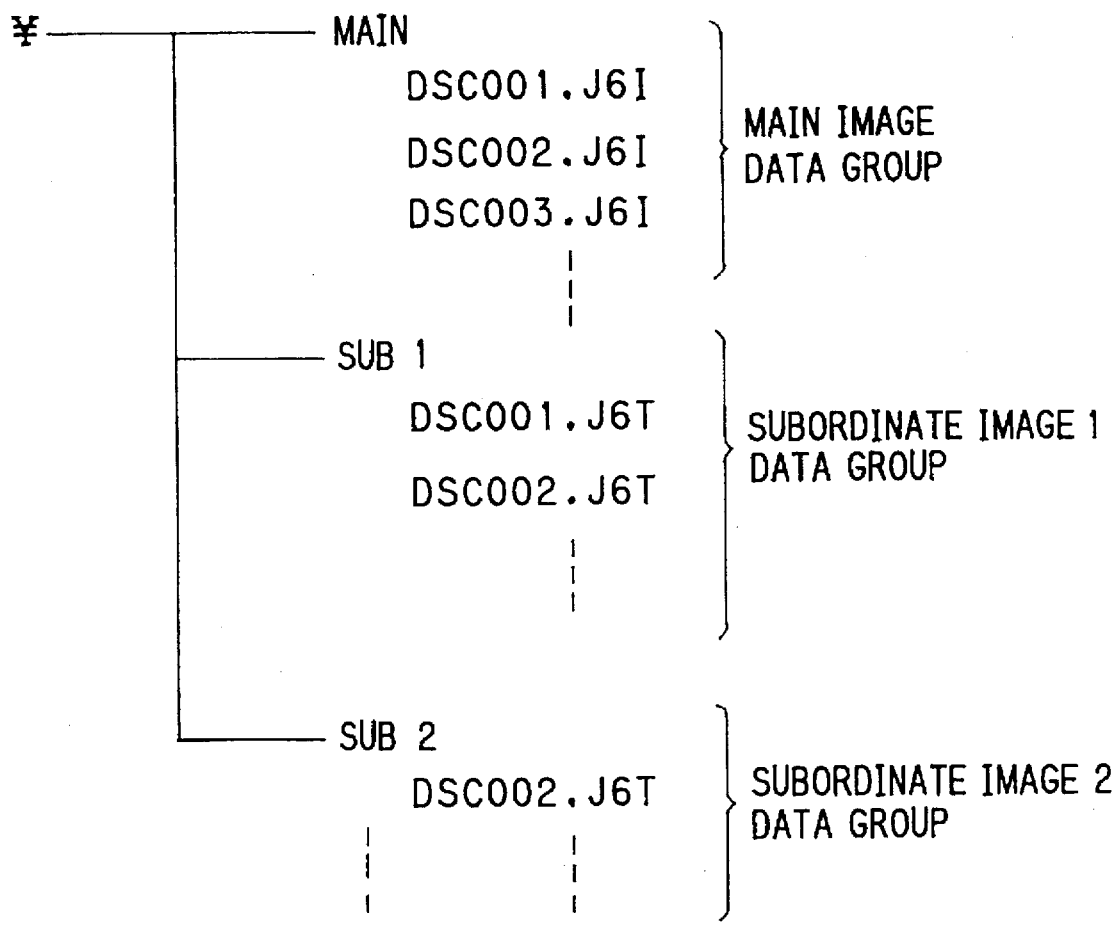
FIG. 9 shows a directory structure example, in which the main and subordinate image data are recorded in separate files while relating together the individual files with the directory.

FIG. 9 shows a directory structure example, in which the main and subordinate image data are recorded in separate files while relating together the individual files through the directory. By using this directory, not only it is possible to obtain the same advantages as in the case of using file names, but also it is possible to obtain easy frame No. management. This is so because unlike the other examples of frame recording the directory produced is such that the sole main image is recorded therein. This permits frame No. management in directory entry as in the prior art.

In this example, the directory "MAIN" includes a main image data group, the directory "SUB1" includes a subordinate image 1 data group, and the directory "SUB2" shows a subordinate image 2 data group. For example, subordinate image 1 in file "DSC002.J6I" is shown as "¥SUBI¥DSC002.J6T", and subordinate image 2 in file "DSC002.J6I" is shown as "\SUB2\DSC002.J6T".

Figure 10:
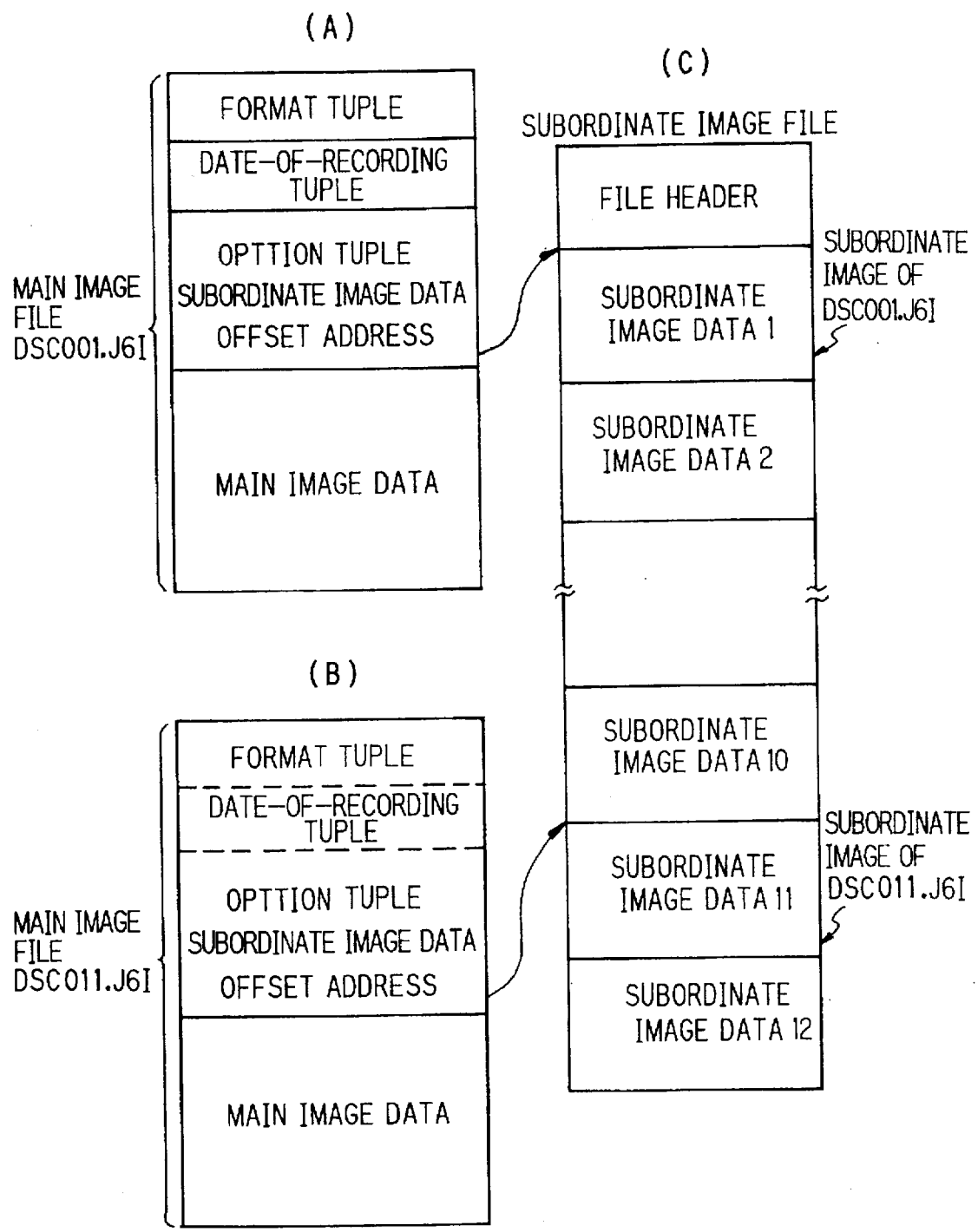
FIG. 10 shows an example in which the main and subordinate image data are recorded in separate files.

FIG. 10 shows an example in which the main and subordinate image data are recorded in separate files. The main image file is an independent file and the subordinate image files are stored as a collective file. This method, with the subordinate image data recorded in the collective file, permits ready index display (reproduction of the sole subordinate image) or the like.

Shown in (A) of FIG. 10 is an example of the main image file DSCOO1.J6I, which is constituted by a file header with records of format tuple, date-of-recording tuple, option tuple and subordinate image data off-set address and a subsequent record of main image data. Shown in (B) is an example of the main image file DSCO11.J6I, which is constituted by a file header with records of format tuple, data-of-recording tuple, option tuple and subordinate image data off-set address and a subsequent record of main image data. Shown in (C) is a sole subordinate image file for recording subordinate image data with respect to main image data. In the subordinate image file shown in (C), subsequent to a file header is recorded a subordinate image in file DSCOO1.J6I as subordinate image data 1. Subsequently, subordinate image data 2, 3 . . . are recorded likewise. Afterwards, subordinate image data of, for instance, file DSCOO1.J6I is recorded as subordinate image data 11, and the image data is recorded up to subordinate image data 12.

The file header of the collective subordinate image file may be the number of the subordinate images, image parameters of the subordinate image, the start or end address of the subordinate image data, the file name of the main image corresponding to the subordinate image, etc. Where the collective subordinate image file is used as the index file, the main image can be retrieved from the subordinate image.

Figure 11:
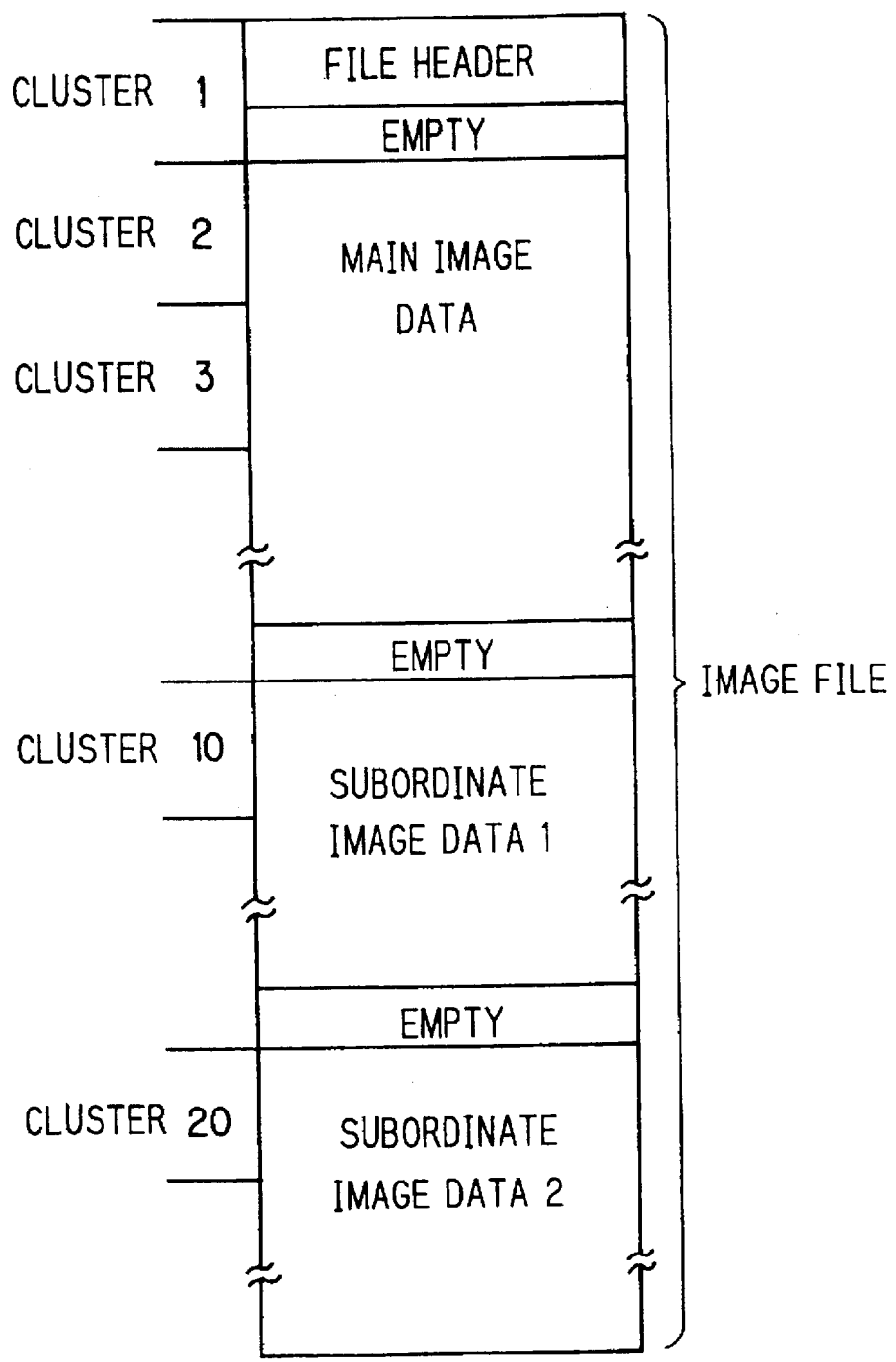
FIG. 11 shows an example of designating the image data recording start address in units of clusters.

FIG. 11 shows an example of designating the image data recording start address in units of clusters. Here, a file header is recorded in cluster 1, main image data 1 in clusters 2, 3, . . . subordinate image data 1 in clusters 10, 11 . . . and subordinate image data 2 in clusters 20, 21, . . . .. In this embodiment, the subordinate image data 1 may be erased without operating the subordinate image data themselves at all but by merely erasing the subordinate image portion in the image file FAT chain and re-writing the FAT chain. Meanwhile, in the prior art recording start address designation, the sole subordinate image data 1 may be erased by erasing the subordinate image data and then filling the place with the subordinate image data 2. Thus, by providing 2 bytes for the recording start address, high speed retrieval of the image and the extraction of the sole main image can be readily obtained, and also subordinate image data can be readily obtained.

Figure 12:
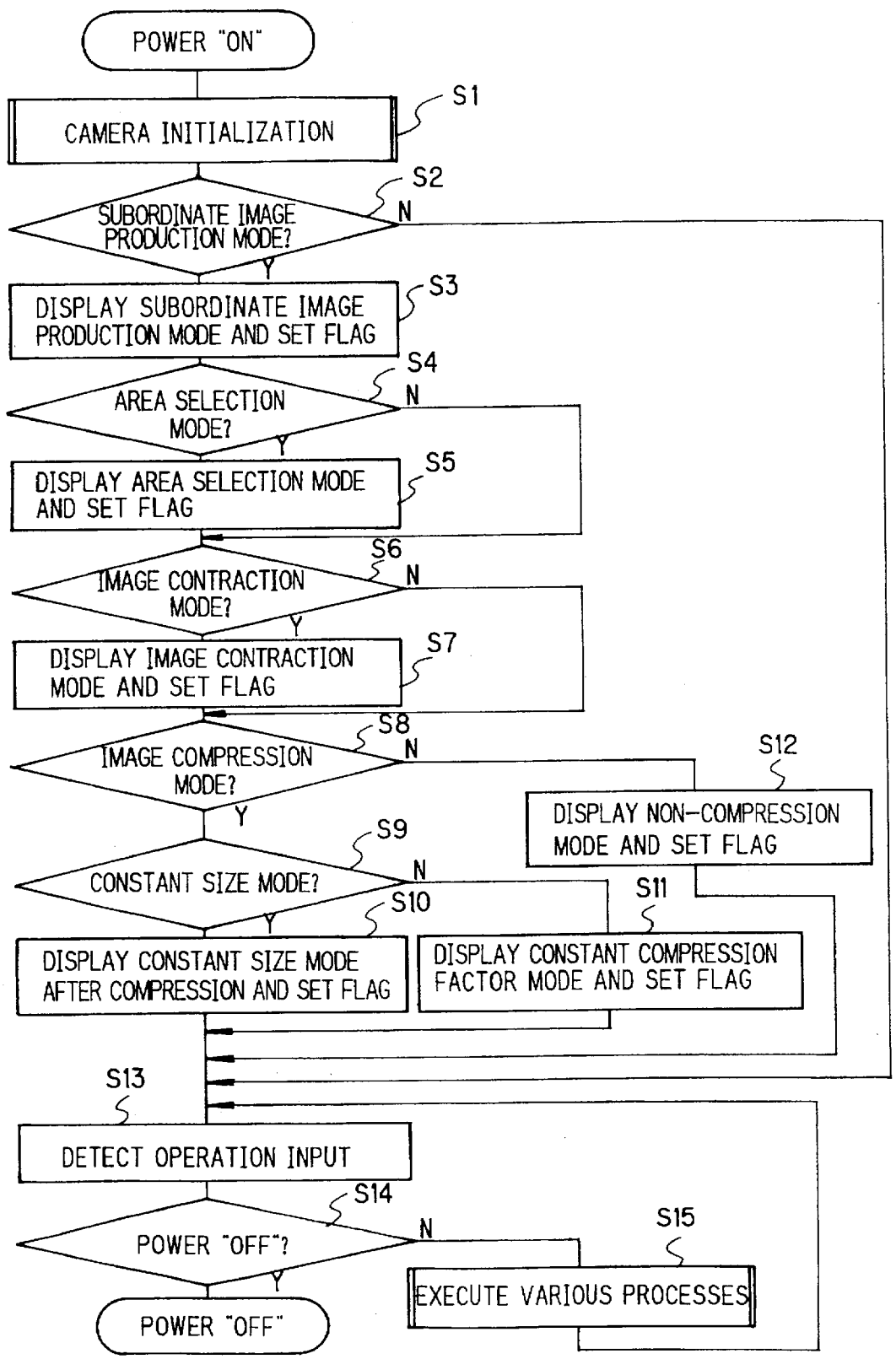
FIG. 12 shows the operation sequence of an embodiment of the digital still camera, according to the present invention.

Now, the operation sequence of this embodiment of the digital still camera according to the present invention will be described with reference to the flow chart of FIG. 12.

After the power "on", camera operation conditions such as zooming are initialized (step S1). Then a check is made as to whether the camera is in a subordinate image production mode (step S2). If in this mode, the mode information is displayed on display unit 17, while setting a flag indicative of this mode (step S3), and then a check is made as to whether there is an area selection mode, in which to select an area to be extracted as the subordinate image from the main image (step S4). If no subordinate image production mode is detected in the step S2, the routine goes to a step S13 to be described later.

If it is found in the step S4 that the are selection note prevails, the fact that this mode prevails is displayed, while setting a flag indicative of this face (step S5), and then a check is made as to whether there prevails an image contraction mode in which the image is contracted (step S6). If no area selection mode prevails, the routine goes to the step S6. If the image contraction mode prevails, the fact that this mode prevails is displayed, while setting the pertinent flag (step S7). If no image contraction mode prevails, a check is made as to whether an image compression mode prevails (step S8). Through the image contraction as noted above, it is possible to obtain the entirety of the image in a contracted size.

If it is found in the step S8 that the image compression mode prevails, whether a constant size mode has been set is checked (step S9) to check whether a process, in which the compression factor is constant, or a process in which the size (data quantity) is constant, is used for compression. If the constant size mode prevails, after the compression the fact that this mode prevails is displayed, while setting the pertinent flag (step S10). If no constant size mode prevails, the constant compression factor mode prevails. In this case, the fact that this mode prevails is displayed, while setting the pertinent flag (step S11). If it is found in the step S8 that no image compression mode has been set, the fact that a non-compression mode prevails is displayed, while setting the pertinent flag (step S12). After the processes in steps S10 to S12; operation input provided as a result of operation in input unit 18 is detected (step S13), and a check is made as to whether the power is "off" (step S14). If the power is "off", an end is brought to the operation. If the power is not "off", various processes corresponding to the input operations are executed (step S15), and the routine goes back the step S13.

Figure 13:
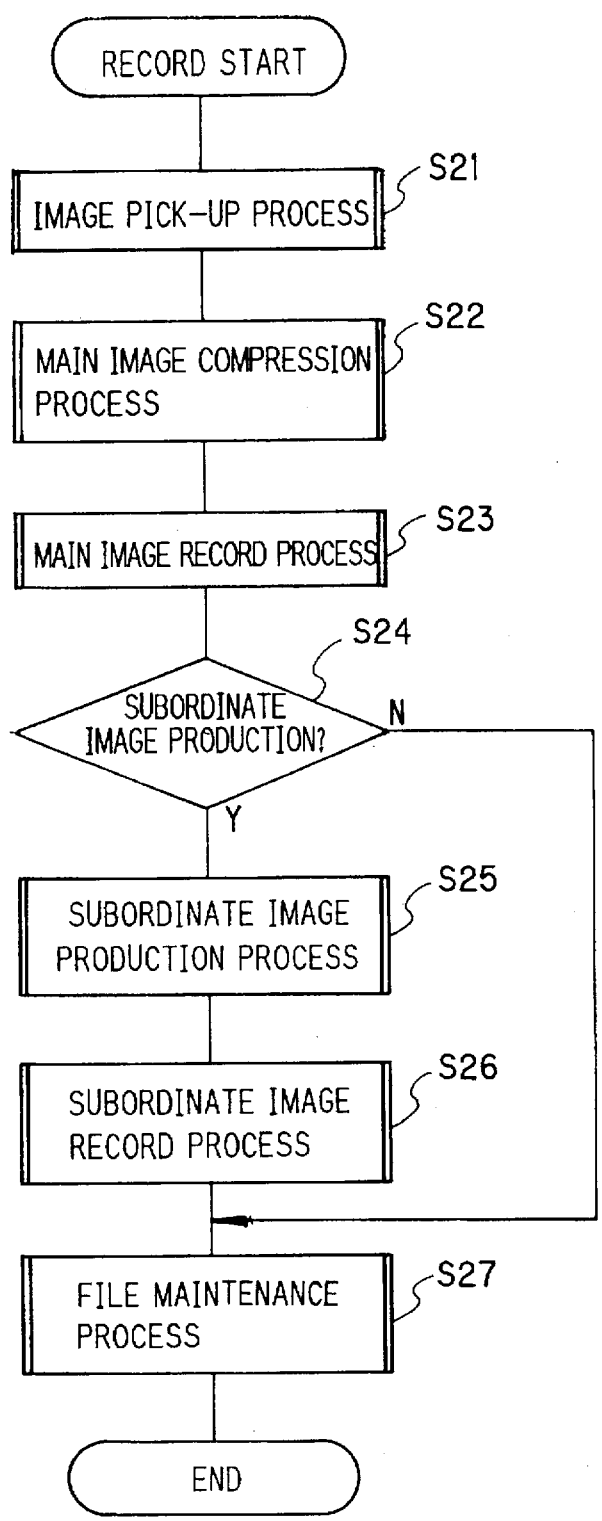
FIG. 13 shows a flow chart illustrating an image data recording sequence in the case of recording the subordinate image data after the recording of the main image data.

FIG. 13 is a flow chart illustrating an image data recording sequence in the case of recording the subordinate image data after the recording of the main image data.

The routine is started upon reception of a recording instruction provided as a result of operation in operation unit 18. First, subsequent to the processings in optical system 1, imaging circuit 2, clamping circuit 3 and A/D converter 4, an imaging process including the process of writing data in frame memory 11 is executed (step S21). Then, the main image compression process in DCT/IDCT circuit 12 and coder/decoder 13 for the main image data read out from frame memory 11 is executed (step S22). Then, the compressed main image data is recorded in IC memory card 15 (step S23). Then, a check is made as to whether the subordinate image is to be produced (step S24). This check is made on the basis of the result of the check in step S3 in FIG. 12 as to whether the subordinate image production mode has been set.

If it is determined in step S24 that the subordinate image is to be produced, the subordinate image production step is executed (step S25), and after the recording process of recording subordinate image in IC memory card (step S26) a file maintenance process is executed (step S27), thus bringing an end to the routine. If it is determined in step S24 that no subordinate image is to be produced, the maintenance process in step S27 is executed directly. When the files are recorded and managed in DOS format, for instance, the file maintenance process may be writing processes in format such as directory entry, FAT, etc.

Figure 14:
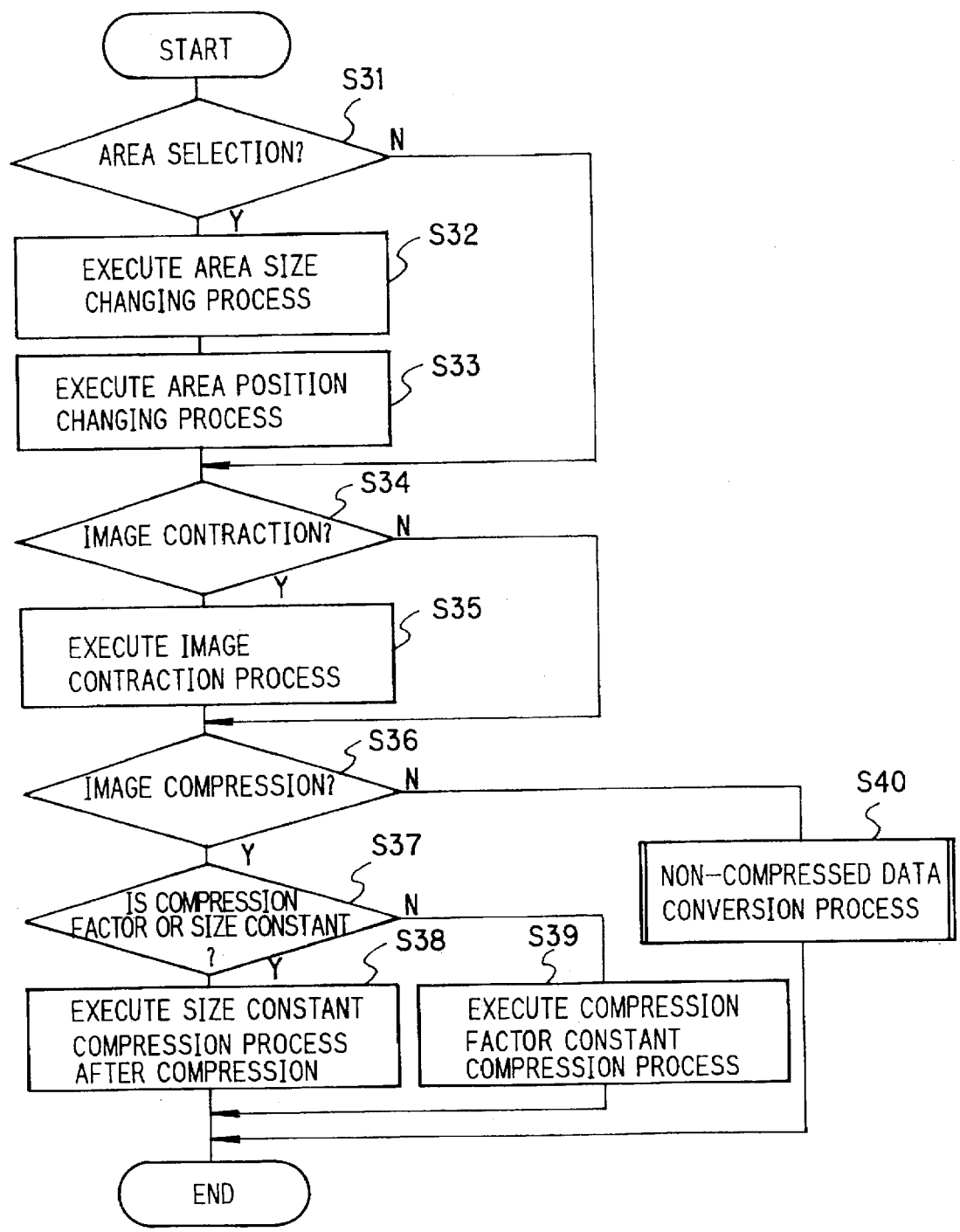
FIG. 14 shows a flow chart illustrating the sequence of the subordinate image production process in step S25 of FIG. 13.

FIG. 14 is a flow chart showing the sequence of subordinate image production process in step S25 of FIG. 13.

First, a check is made as to whether there has been an area selecting mode for selecting a subordinate image production area for the main image (step S31). If the area selection mode prevails, an area size changing process for changing the area size is executed (step S32), and then an area position changing process for changing the area position is executed (step S33). After step S33 or if it is determined in step S31 that no area selecting mode prevails, a check as to whether the image is to be contracted is made in step S34. Here, if it is determined that the image contraction is to be made, an image contraction process is executed by means of thinning read-out of the image data from frame memory 11 (step S35). After step S35 or if it is found in step S34 that the image contraction is not to be made, a check is made as to whether the compression of the image is to be made (step S36). If it is determined that the image is to be compressed, a check as to whether constant size has been designated is made for determining whether compression factor or size (i.e., data quantity) is made constant for the data compression (step S37).

If it is found in step S37 that there has been constant size designation, a compression process is executed to provide a constant data size obtained by the compression (step S38). If no constant size designation is detected, a compression process with a constant compression factor is executed (step S39). After either process, the routine is ended. If it is determined in step S36 that the image is not to be compressed, the image data read out from frame memory 11 is subjected without compression to a non-compressed data conversion process, such as a conversion conforming to a format necessary for personal computer processing, is executed (step S40), thus bringing an end to the routine. When the image data is processed within the camera, the image data is directly written in an IC memory without execution of the above conversion process. As for the contracted and compressed image, ⅛ contracted image may be obtained by recording only the DC components of the orthogonal coefficient data output from the DCT/IDCT circuit 12. According to this process, it becomes possible to obtain satisfactory image quality with a higher reproducibility than in the case of the contracted image obtained by the usual thinning process. It is also possible to simplify the circuit since the memory control for both the main and subordinate images may be performed in a similar way.

In the above example shown in FIG. 14, the subordinate image producing means includes three specific subordinate image producing means, i.e., the area selecting means, the image contracting means and the image compressing means, these three means being selected as desired by the operator for producing the desired subordinate image. This embodiment, however, is by no means limitative, and according to the invention it is possible to provide either one or two of the above three means, or it is possible to suitably change the sequence of the processes that are executed by the three means. In this case, the subordinate image producing means for the first process is referred to as a first subordinate image producing means, and that for a subsequent process is referred to as a second subordinate image producing means. As for the timing of the actual processes in the first and second subordinate image producing means, it is possible to process data simultaneously on the frame memory, or time division basis processing is possible.

Figure 15:
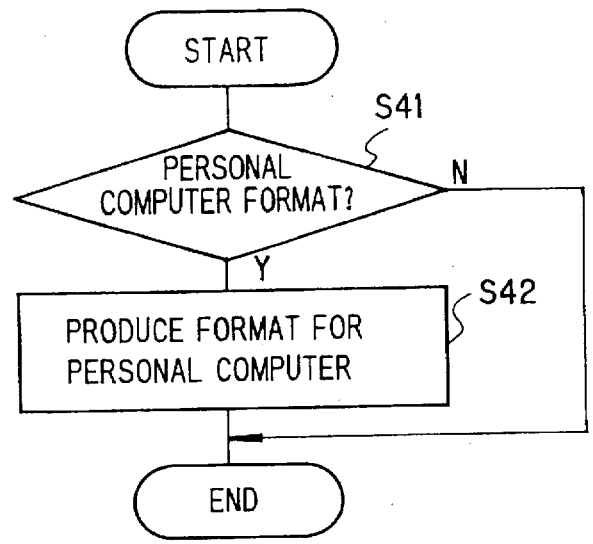
FIG. 15 shows the routine of the non-compressed data conversion process.

The routine of the non-compressed data conversion process is shown in the flow chart of FIG. 15.

As shown in FIG. 15, first a check is made as to whether the data is to be recorded with the format of a relevant computer (step S41). If not, the routine is ended. If the relevant computer format is to be used, the conversion conforming the personal computer format is executed (step S42), thereby ending the routine.

There are two general non-compressed data recording systems, i.e., a RGB and a YCbCr system. The RGB system is suitable for the reproduction by the personal computer, while the YCbCr system is suitable for reproduction by the camera.

Figure 16:
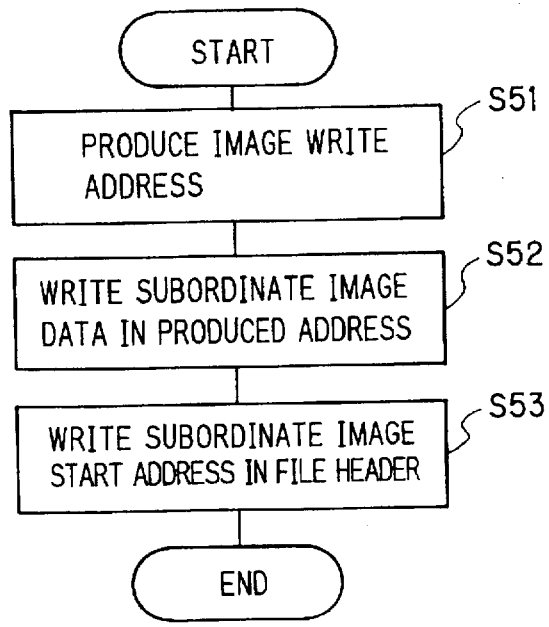
FIG. 16 shows the subordinate image recording process in step S26 of FIG. 13.

The subordinate image recording process in the step S26 of FIG. 13 is executed as a routine shown in the flow chart of FIG. 16. In this instance, the image write address is produced (step S51), then the subordinate image data is written in the produced address (step S52), and then the subordinate image start address is written in the file header (step S53). In this way, quick data reproduction can be obtained.

Figure 17:
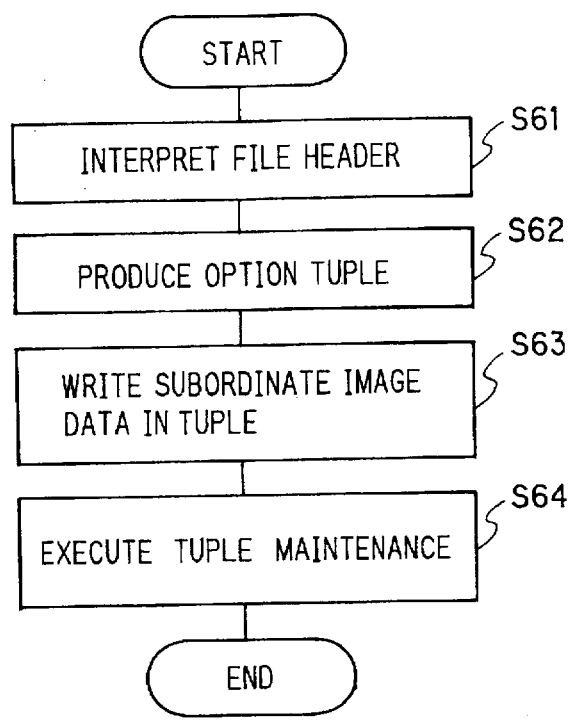
FIG. 17 shows the writing of data in the file header, as is also described in connection with FIG.

The writing of data in the file header, as is also described in connection with FIG. 4, is executed by a routine shown in FIG. 17. As shown, first the file header is interpreted (step S61), then an option tuple is produced for each subordinate image record (step S62), then the subordinate image data is written in the tuple (step S63), and then tuple maintenance is executed (step S64), thus bringing an end to the routine. The tuple maintenance is such a process as to write a file header size which is determined after the data writing.

Figure 18:
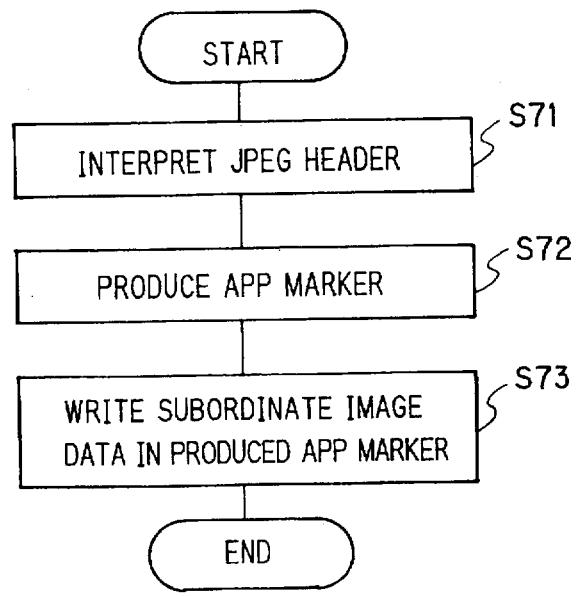
FIG. 18 shows a flow chart illustrating the routine of the writing process of the subordinate image data, as shown in FIG. 5, in a JPEG header.

FIG. 18 is a flow chart showing the routine of the writing process of the subordinate image data as shown in FIG. 5 in a JPEG header. Here, first the JPEG header is interpreted (that is, JPEG format is interpreted) (step S71), then an application (APP) marker is produced (step S72), and the subordinate image data is written in the produced APP marker (step S73).

Figure 19:
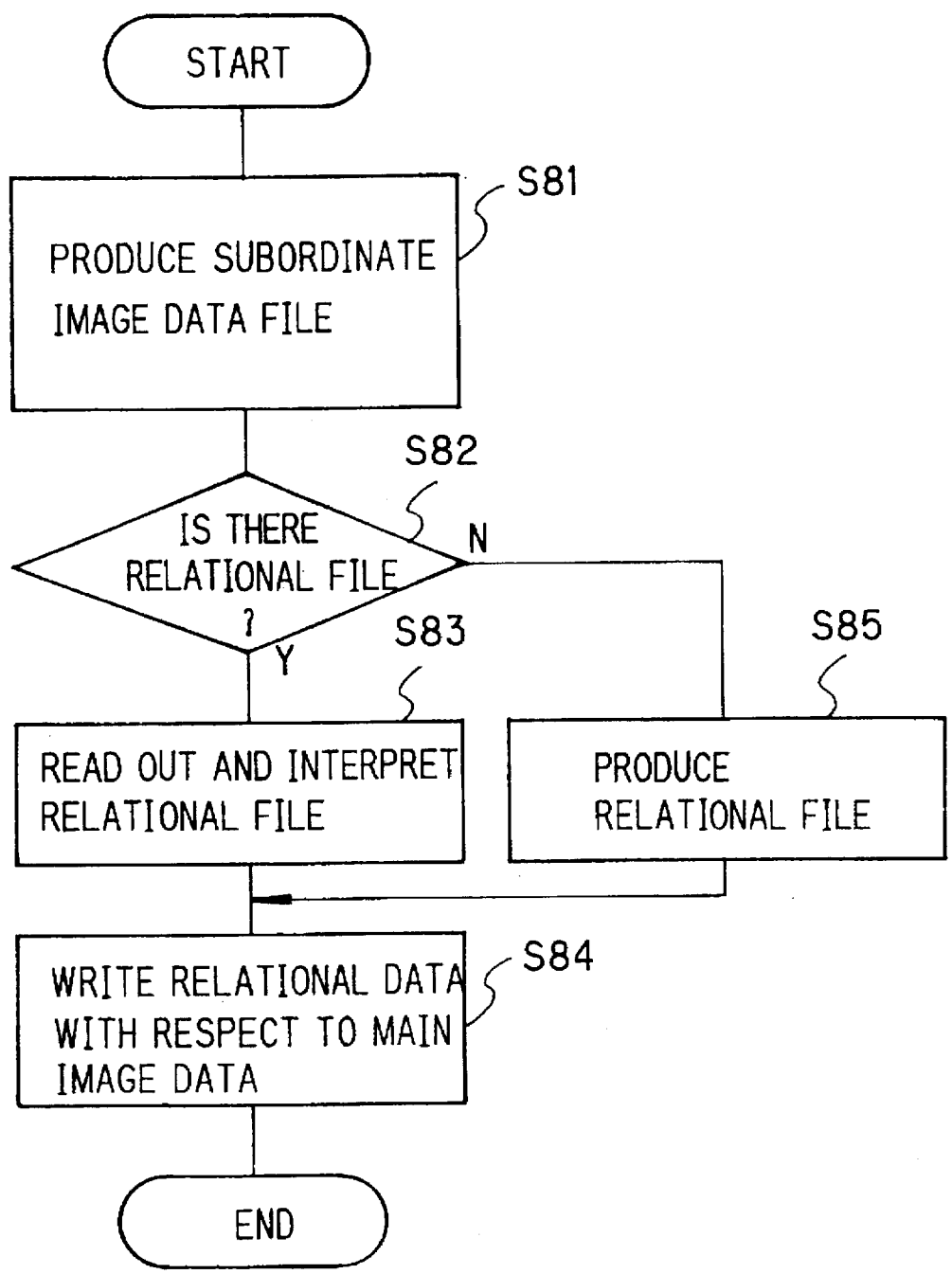
FIG. 19 shows a flow chart illustrating the sequence of subordinate image recording for relating image data based on the relational file shown in FIG. 6.

FIG. 19 is a flow chart showing the sequence of subordinate image recording for relating image data based on the relational file shown in FIG. 6.

In this case, a subordinate data file is produced (step S81), and then a check is made as to whether there is a relational file (step S82). If there is a relational file, the relational file is read out and interpreted (step S83). If not, a relational file is then produced (step S85). After steps S83 and S85, the relational data with respect to the main image data is written (step S84), thus bringing an end to the routine.

Figure 20:
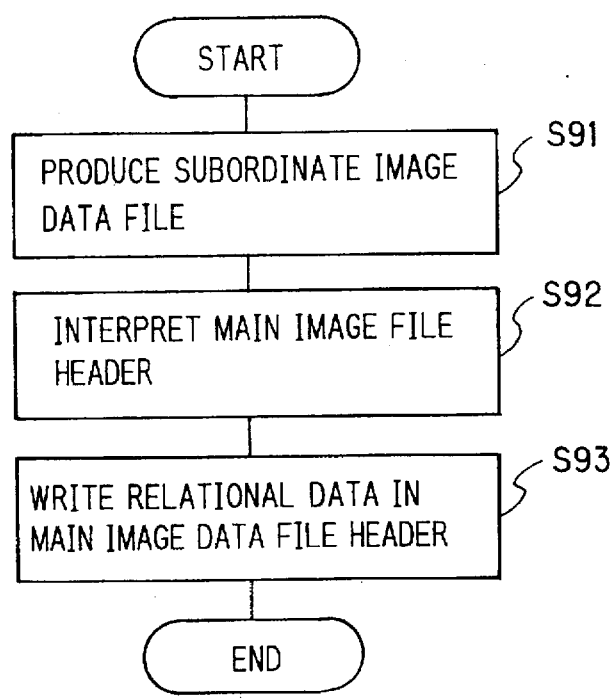
FIG. 20 shows a flow chart illustrating the sequence of subordinate image recording for relating the data with the file header shown in FIG. 7.

FIG. 20 is a flow chart showing the sequence of subordinate image recording for relating the data with the file header shown in FIG. 7.

In this sequence, after a subordinate image data file is produced (step S91), and the main image file header is interpreted (step S92), the relational data is written in the main image data file header (step S93), thus bringing an end to the routine.

Figure 21:
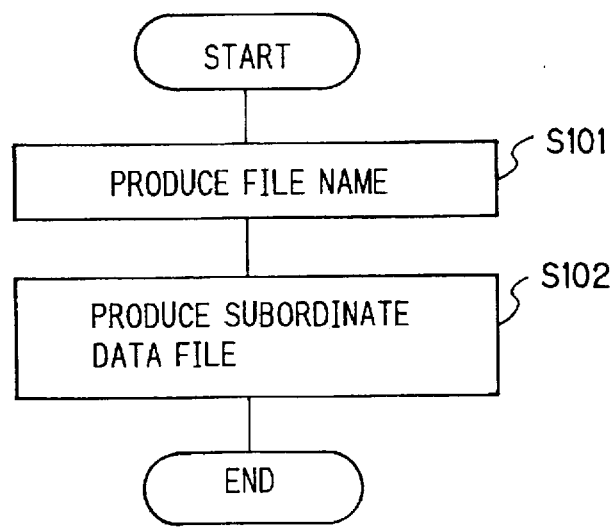
FIG. 21 shows a flow chart representing the sequence of subordinate image recording for relating data by file names as shown in FIG. 8.

FIG. 21 is a flow chart showing the sequence of subordinate image recording for relating data by file names as shown in FIG. 8.

In this sequence, the file name configuration is confirmed, and an appropriate file name consistent with the configuration is produced (step S101). Then the subordinate image data file is produced with the produced file name (step S102), thus bringing an end to the routine.

Figure 22:
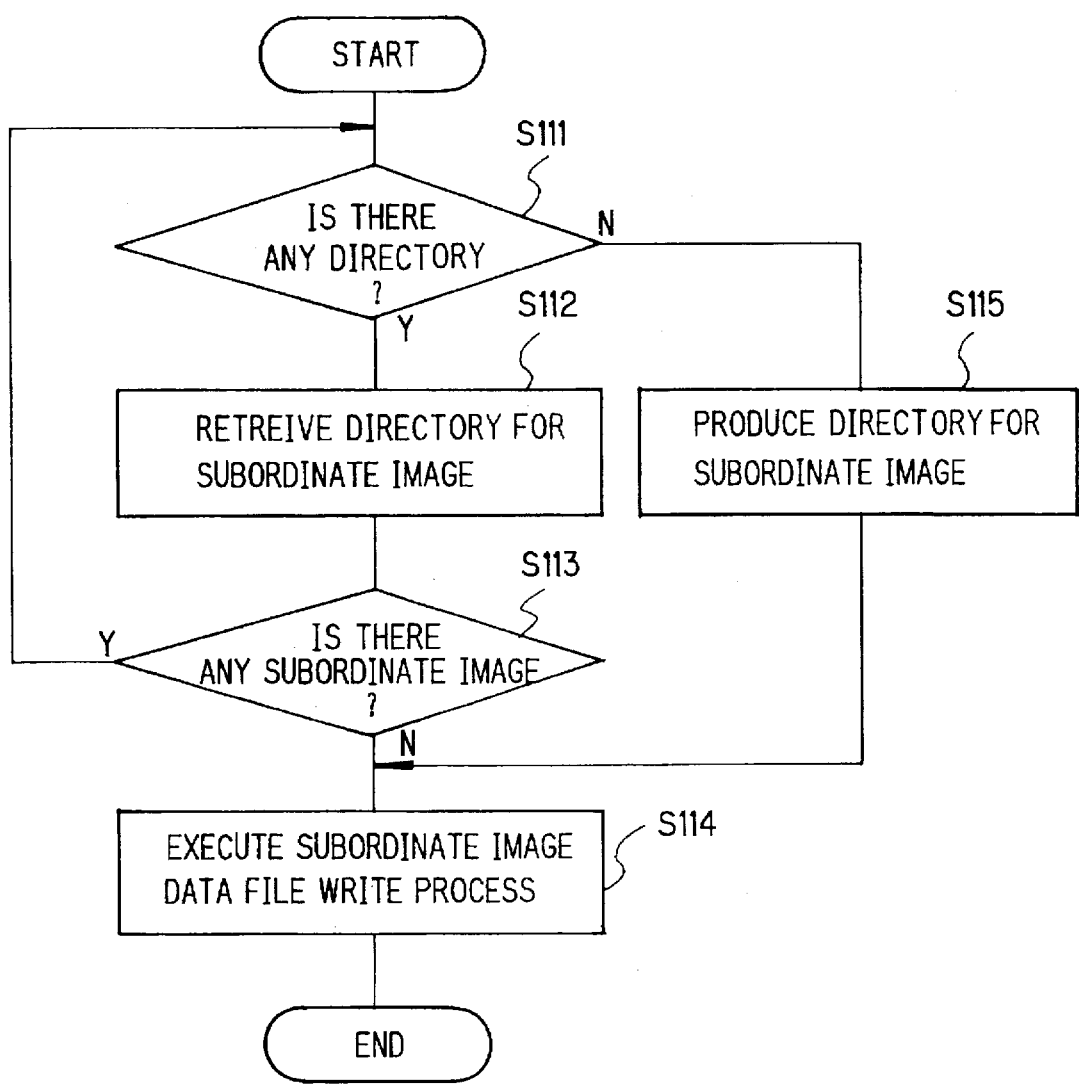
FIG. 22 shows a flow chart representing the sequence of subordinate image recording for relating the data by directories as shown in FIG. 9.

FIG. 22 is a flow chart showing the sequence of subordinate image recording for relating the data by directories as shown in FIG. 9.

First, a check is made as to whether there is any directory (step S111). If there are directories, the directory for the subordinate image is retrieved (step S112), and then a check is made as to whether there is any subordinate image (step S113). If there is a subordinate image, the routine goes back to step S111 to retrieve the next directory. If not, a subordinate image data file write process is executed (step S114), thus bringing an end to the routine. If it is determined in step S111 that there is no directory, a directory for the subordinate image is produced (step S115), and then the process in step S114 is executed.

Figure 23:
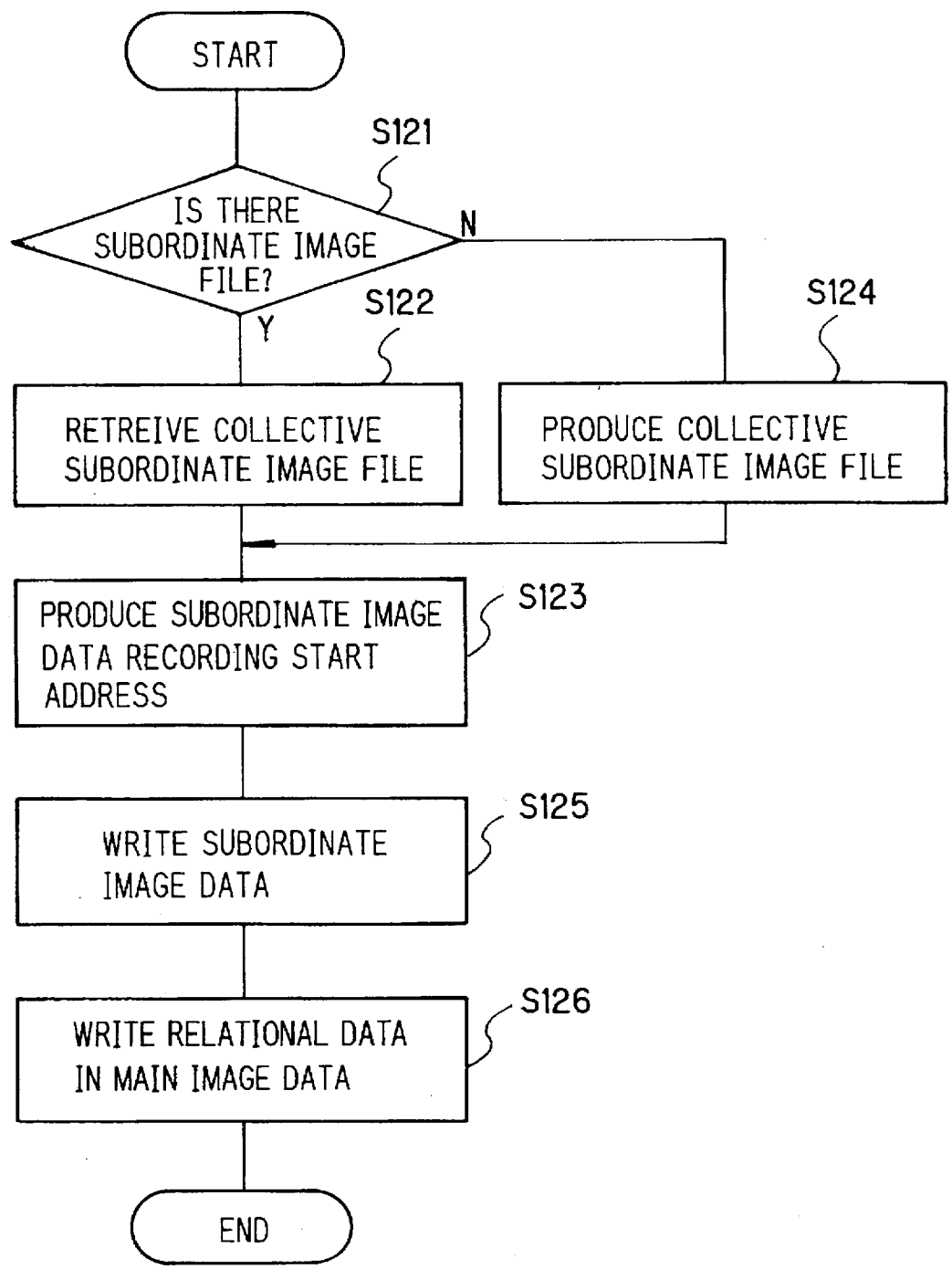
FIG. 23 shows a flow chart representing the sequence of recording the subordinate image data, in which a collective data file for the subordinate image, as shown in FIG. 10, is utilized.

FIG. 23 is a flow chart showing the sequence of recording the subordinate image data in which a collective data file for the subordinate image, as shown in FIG. 10, is utilized.

In this sequence, a check is first made as to whether there is a subordinate image file (step S121). If there is, the collective subordinate image file is retrieved (step S122) to confirm the number of the subordinate images, the data written in the file header, etc., and then a subordinate image data recording start address is produced (step S123). If it is found in step S121 that there is no subordinate image file, a collective subordinate image file is produced (step S124), and then step S123 is executed. After the process of the step S123, the subordinate image data is written (step S125), and then the relational data with the main image data is written (step S126), thus bringing an end to the routine.

Now, the operation of continuous image generation with a digital still camera will be described with reference to FIG. 24.

The recording operation is started in response to shutter button depression or the like. First, a image pick-up process is executed to obtain the main image data (step S131). The main image data thus obtained is compressed (step S132) and then recorded (step S133). Thereafter, a check is made as to whether there is a subordinate image producing mode (step S134). If there is the subordinate image producing mode, a check is made as to whether a continuous image pick-up mode has been set (step S135). If this mode has been designated, the subordinate image producing conditions are judged (step S136). This judgment is a process for determining which one of the subordinate images of the main image was obtained by the continuous image pick-up.

Then, whether the subordinate image is to be produced is checked through flag detection (step S137). If the subordinate image is to be produced, the subordinate image is produced and recorded (step S138). Thereafter, a file maintenance process similar to that described above is executed (step S139). If it is determined in the step S134 that there is no subordinate image producing mode, or if it is determined in the step S137 that no subordinate image is to be produced, the process in step S139 is executed. If it is determined in step S135 that no continuous image pick-up mode has been set, the process in step S138 is executed. After the file maintenance process in step S139 has been executed, a check is made as to whether the recording is to be made continually (i.e., whether the continuous image pick-up is to be continued) (step S140). If it is determined that the recording is to be made continually, the routine goes back to step S131 of the image pick-up process. Otherwise, the routine is ended.

Figure 24:
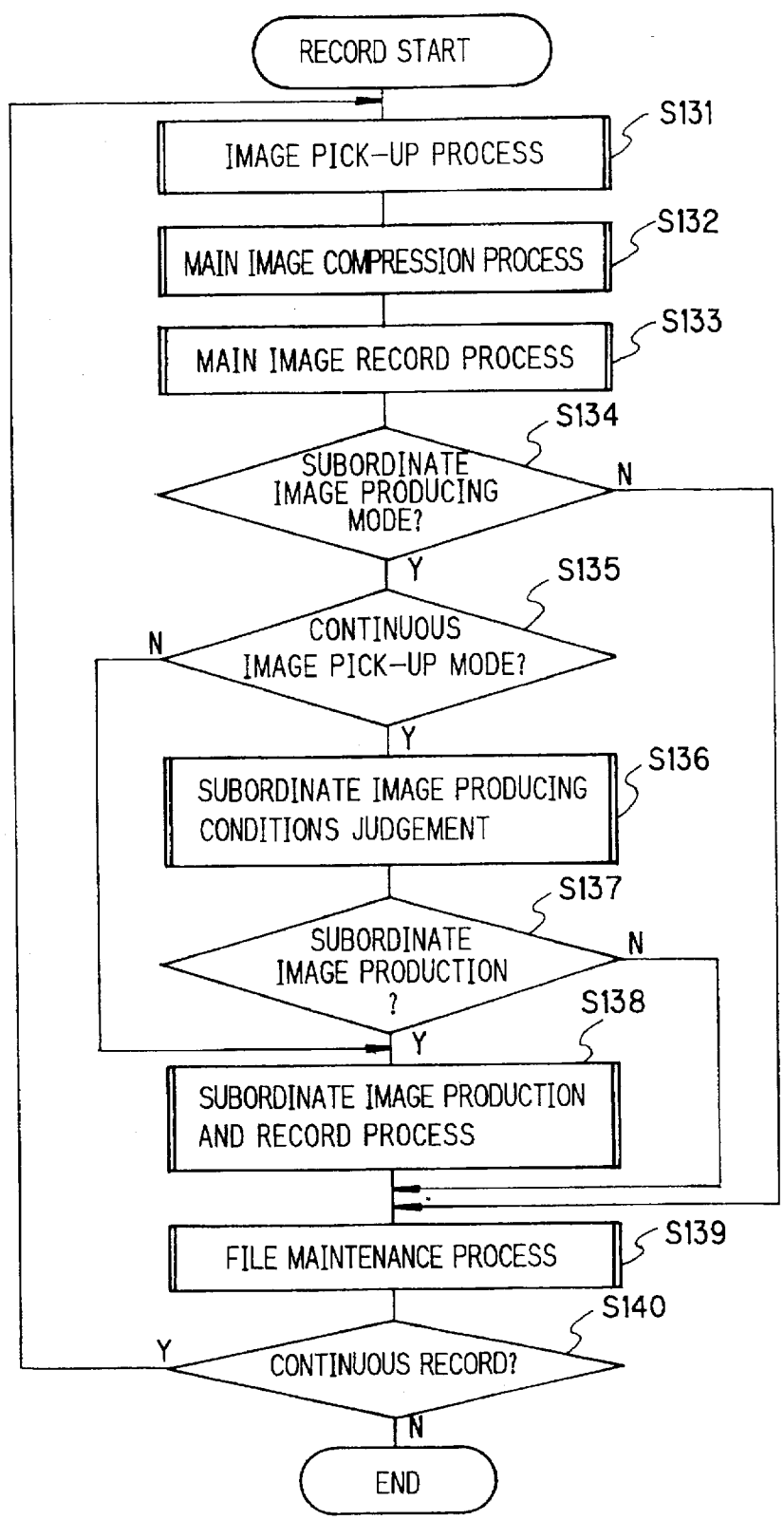
FIG. 24 shows the operation of continuous image generation with a digital still camera.
Figure 25:
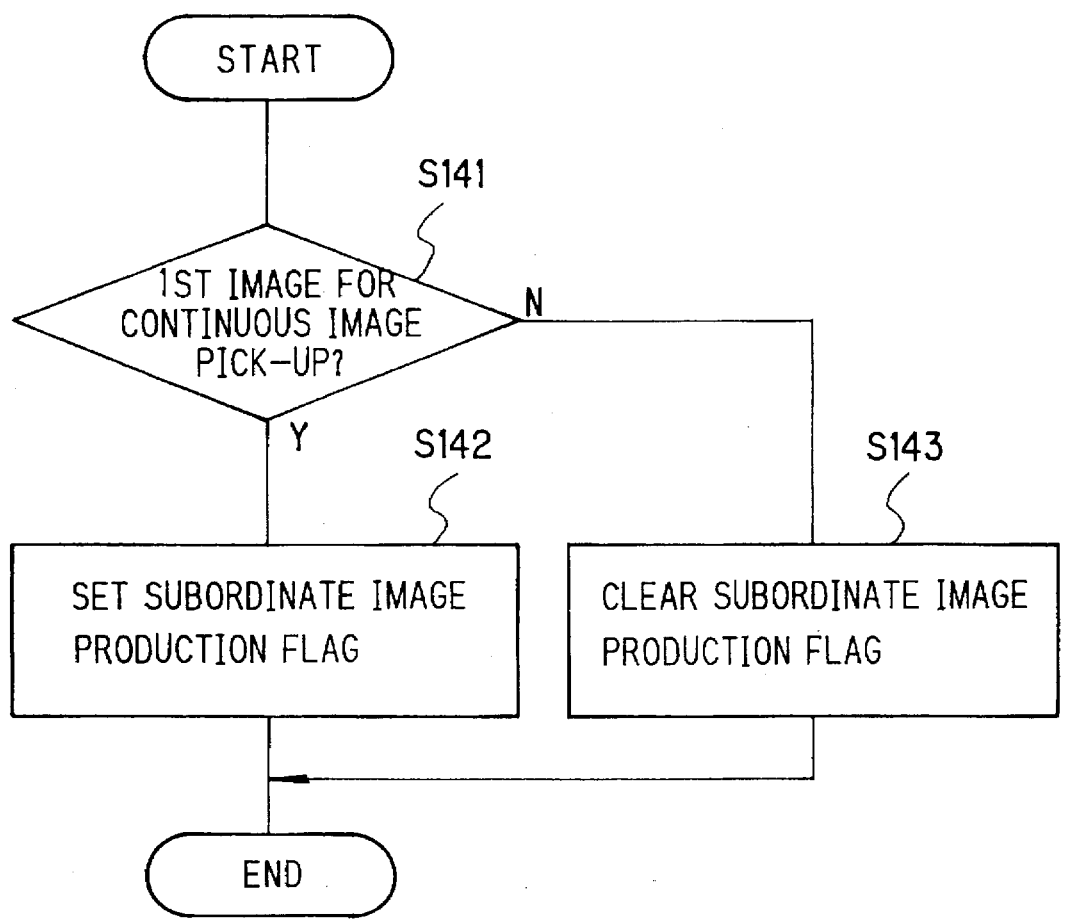
FIG. 25 shows a flow chart illustrating a sequence example of the subordinate image producing condition judgment in step S136 in FIG. 24 at the time of the continuous image pick-up.

FIG. 25 is a flow chart showing the sequence example of the subordinate image producing condition judgment in step S136 in FIG. 24 at the time of the continuous image pick-up.

This example shows the operation of producing the subordinate image with respect to a first one of a plurality of main images obtained by the continuous image pick-up. Any one of the plurality of main images may correspond to the subordinate images to be produced.

Here, a check is first made as to whether it is a first image for the continuous image pick-up (step S141). If so, the subordinate image production flag is set (step S142), thus bringing an end to the routine. If not, the subordinate image production flag is cleared (step S143), thus bringing an end to the routine. It is possible to set the main image for the subordinate image to be produced may be set to be the last record in the continuous image pick up.

Figure 26:
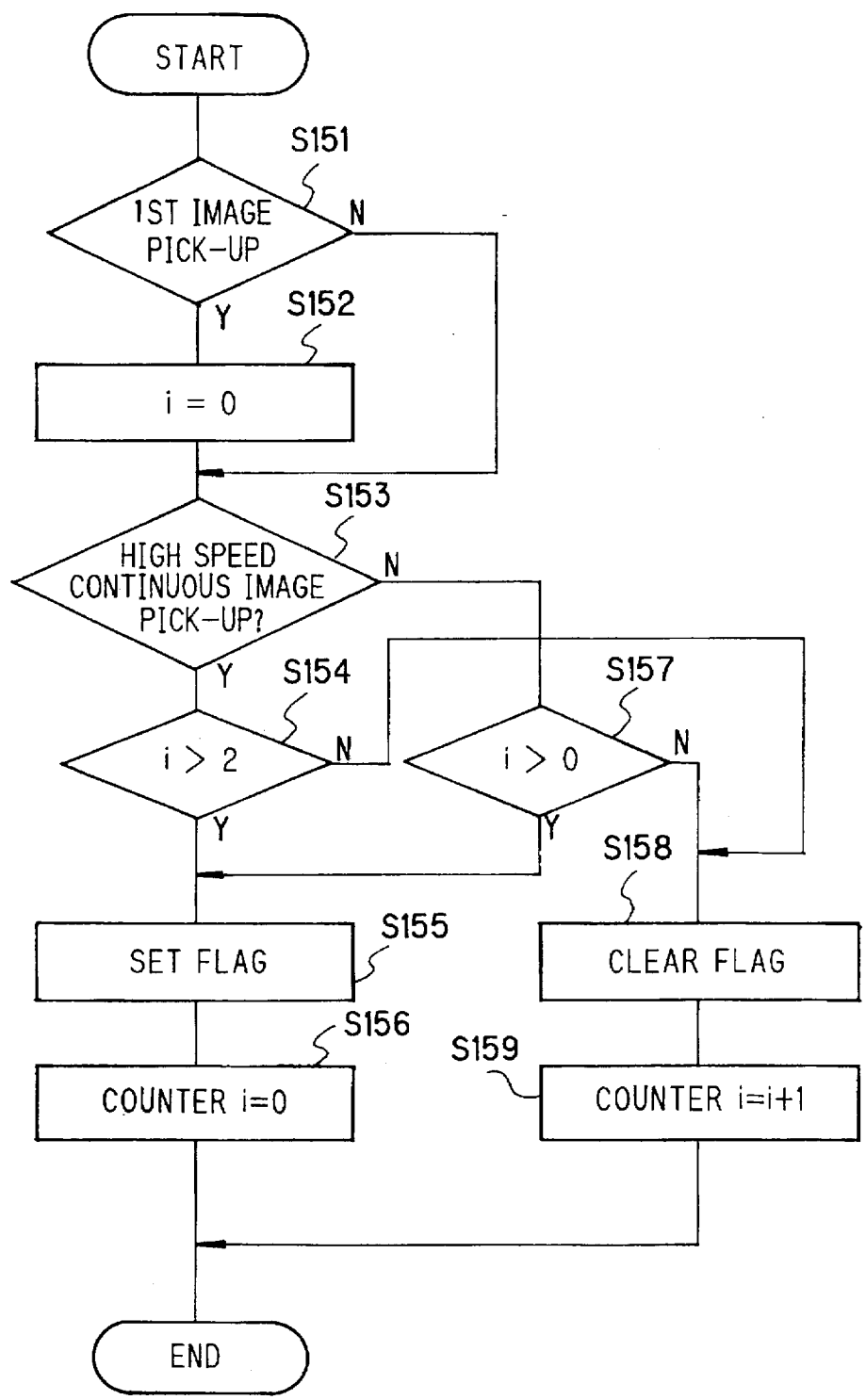
FIG. 26 shows a flow chart illustrating the sequence of automatically selecting and producing the main image necessary for producing the subordinate image from a plurality of main images in conformity to the speed of continuous image pick-up.

FIG. 26 is, unlike the sequence of FIG. 25, a flow chart showing the sequence of automatically selecting and producing the main image necessary for producing the subordinate image from a plurality of main images in conformity to the speed of continuous image pick-up. In this example, a high speed and a low speed continuous image pick-up mode are set. In the high speed continuous image pick-up mode, the subordinate image is obtained for one per four main images, while in the low speed continuous image pick-up mode the subordinate image is obtained for one per two main images.

Here, after the start of operation, a check is made as to whether it-is the first image pick-up in the continuous image pick-up (step S151). If so, the counter value i is cleared to initial value "0" (step S152). Then, a check is made as to whether the continuous image pick-up mode is the high speed mode (step S153). If it is determined in step S151 that it is not the first image pick-up, the process in step S153 is executed.

If it is determined in step S153 that the continuous image pick-up mode is the high speed mode, a check is made as to whether the counter value i is greater than (step S154). If so, a subordinate image production flag indicative of subordinate image production is set (step S155), and then the counter value i is cleared to "0" (step S156), thus bringing an end to the routine. If it is determined in step S153 that the continuous image pick-up mode is the low speed mode, a check is made as to whether the counter value i is greater than "0" (step S157). If so, the process in the step S155 is executed. If the value is not greater than "0", the subordinate image production flag is cleared (step S158), and then the counter value i is incremented by "1" (step S159), thus bringing an end to the routine. If it is found in step S154 that the counter value i is not greater than "2", the process in step S158 is executed.

In this example, the counter value i is first reset to "0", and in the high speed continuous image pick-up mode it is compared with n 2" in step S154, while in the low speed continuous image pickup mode it is compared with "0" in step S157, whereby it is automatically designated and effected to record 4 subordinate images per main image record in the high speed continuous image pick-up mode and 2 subordinate image records per main image record in the low speed continual image pick-up mode.

According to the foregoing process, the subordinate image data is recorded in an IC memory card or like recording medium. The recorded subordinate image data is reproduced on the electronic view finder shown in FIG. 1 or on the screen of a monitor connected to external terminal EXT.

Figure 27:
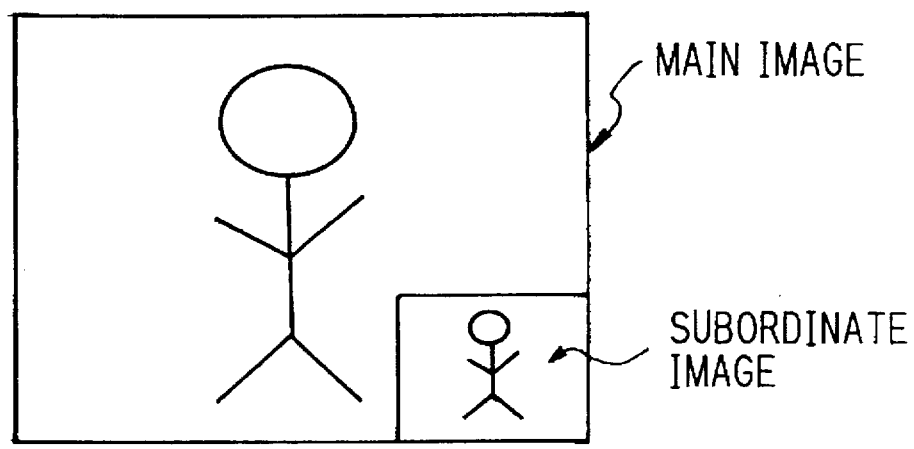
FIG. 27 shows an example of the commonly called image-in-image (picture-in picture) display, in which the subordinate image is displayed on the monitor screen on which the main image is displayed.

FIG. 27 shows an example of a commonly called image-in-image (picture-in picture) display, in which the subordinate image is displayed on the monitor screen on which the main image is displayed.

Figure 28:
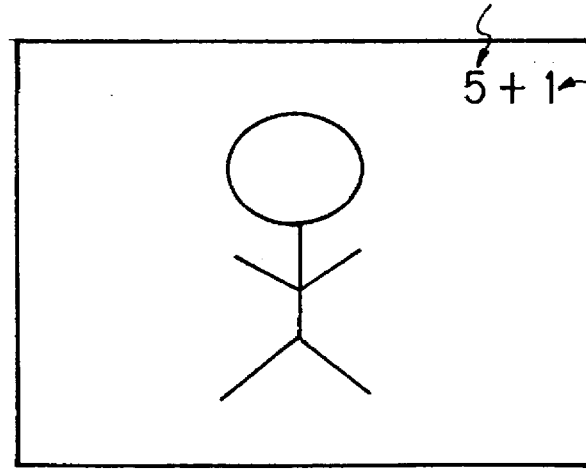
FIG. 28 shows a character display example with frame No. and the number of the subordinate images on part (i.e., right upper portion) of the main image display on the monitor.

FIG. 28 shows a character display example with frame No. and the number of the subordinate images on part (i.e., right upper portion) of the main image display on the monitor.

Figure 29:
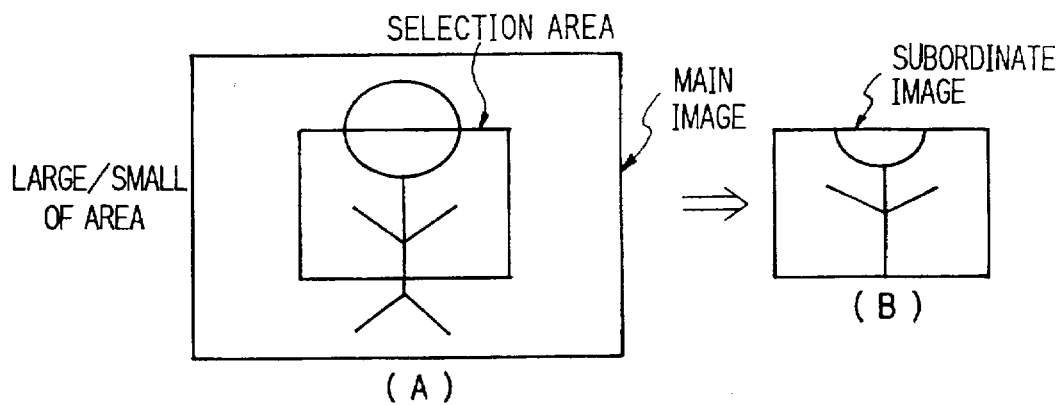
FIGS. 29 and 30 show examples of setting a selection area which is to be extracted as the subordinate image from the main image displayed on the monitor, together with area size.
Figure 30:
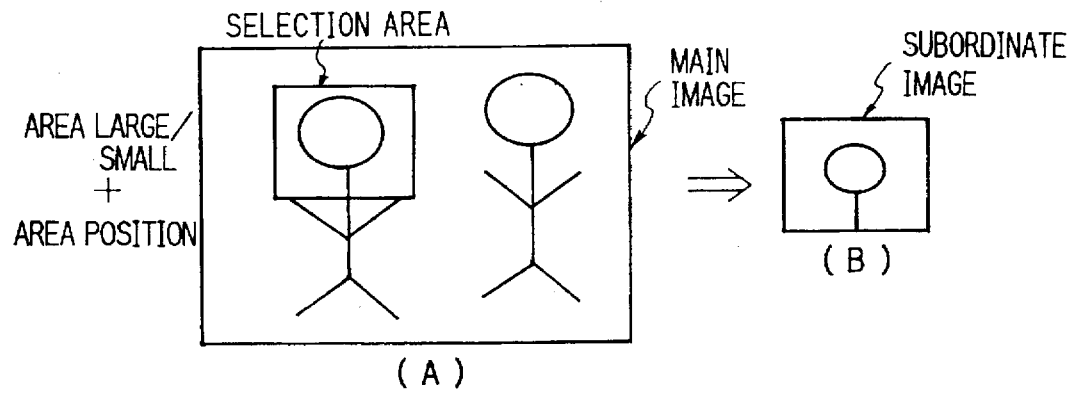

FIGS. 29 and 30 show examples of setting a selection area which is to be extracted as the subordinate image from the main image displayed on the monitor, together with area size. As shown in FIG. 29(A), a central image portion of the displayed main image, as designated by a selected area, is extracted on the basis of an area size designation. The extracted image is displayed as the subordinate image in FIG. 29(B). As shown in FIG. 30(A), the image in the selected area of the main image is extracted on the basis of area size and area position designations. The extracted image is displayed in FIG. 30(B).

Figure 31:
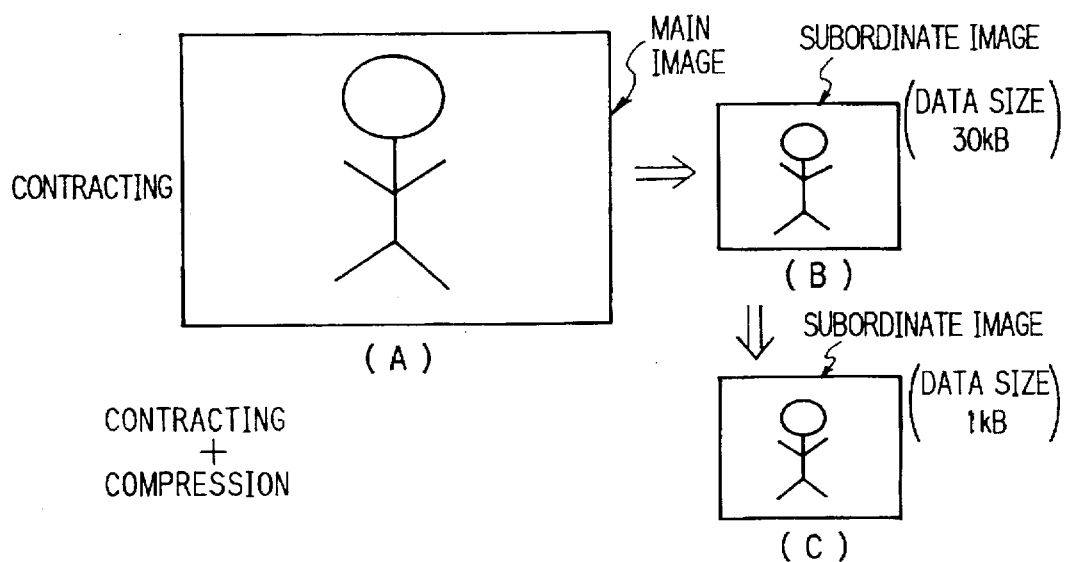
FIGS. 31 shows an example in which part of the main image is made to be the subordinate image, an image obtained by contracting and further compressing the main image is used as the subordinate image.

FIGS. 31 shows an example in which, unlike the cases of FIGS. 29 and 30, part of the main image is made to be the subordinate image, an image obtained by contracting and further compressing the main image is used as the subordinate image. Here, the main image in FIG. 31(A) is contracted to obtain the subordinate image of a data size of 30 kB as shown in FIG. 31(B). This subordinate image is further compressed to an image of a data size of 1 kB as shown in FIG. 31(C).

Figure 32:
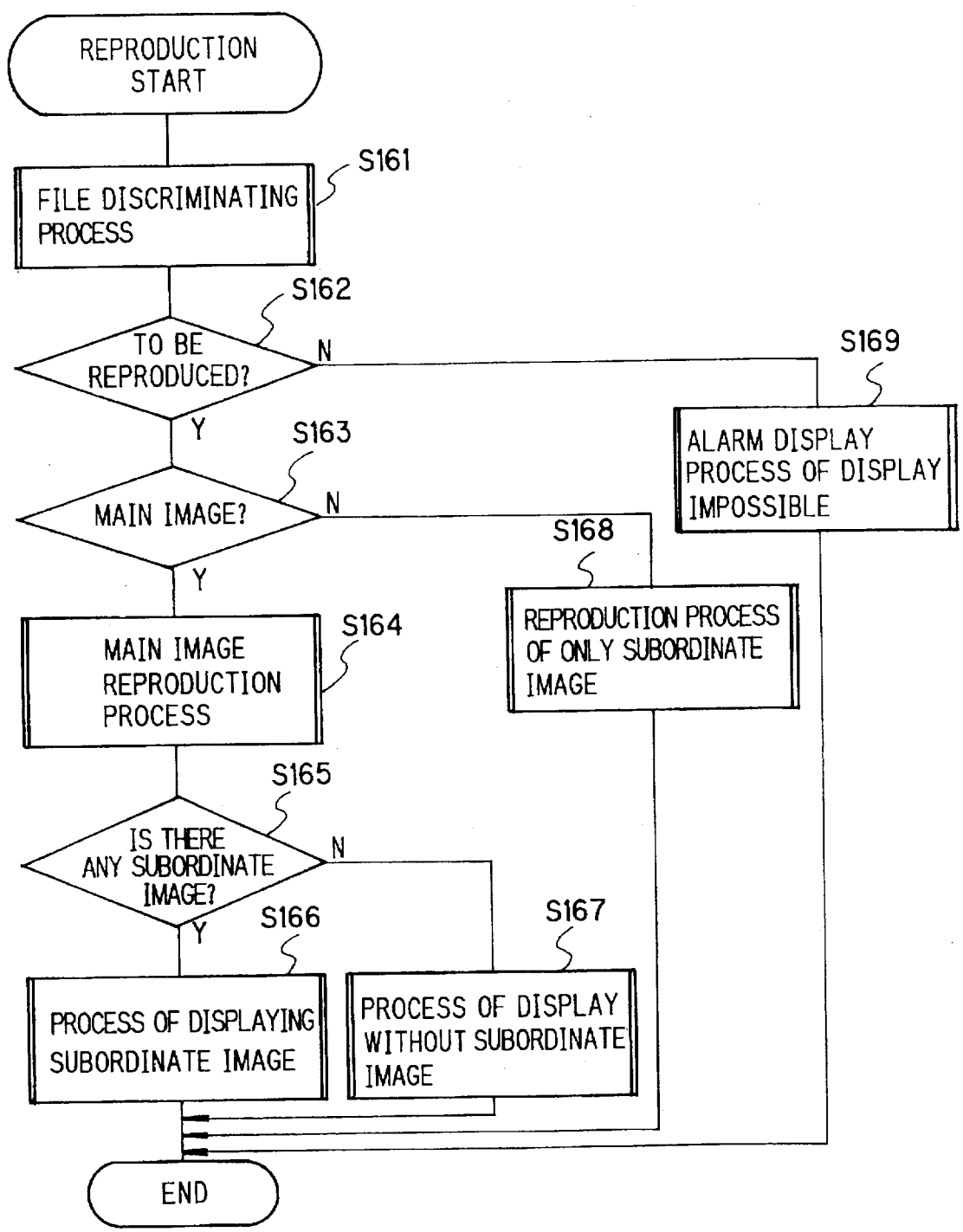
FIG. 32 shows a flow chart illustrating an image reproduction sequence.

FIG. 32 is a flow chart showing an image reproduction sequence which will now be described. When the reproducing operation is started with the setting of a reproducing mode (including frame feeding), a file discriminating process is first executed (step S161) to discriminate the file of a frame to be reproduced, and then a check is made as to whether it is ready to reproduce data (step S162). If it is ready to reproduce, a check is made as to whether the image is the main image (step S163). If so, the main image is reproduced (step S164), and then whether there is a subordinate image is checked (step S165). If it is determined in step S165 that there is a subordinate image, a process of displaying the subordinate image data as shown in FIGS. 27 or 28 is executed (step S166), thus bringing an end to the routine. If it is determined in step S165 that there is no subordinate image, a process of display without subordinate image is executed (step S167).

If it is determined in step S163 that the image is not the main image, that is, it is the subordinate image, only the subordinate image is reproduced (step S168), thus bringing an end to the routine. If it is determined in step S162 that it is not ready to reproduce the data, for example the pertinent file is a voice file or a personal computer data file or the like, a process of displaying an alarm indicative of the fact that it is impossible to reproduce and display the data is executed (step S169), thus bringing an end to the routine.

Figure 33:
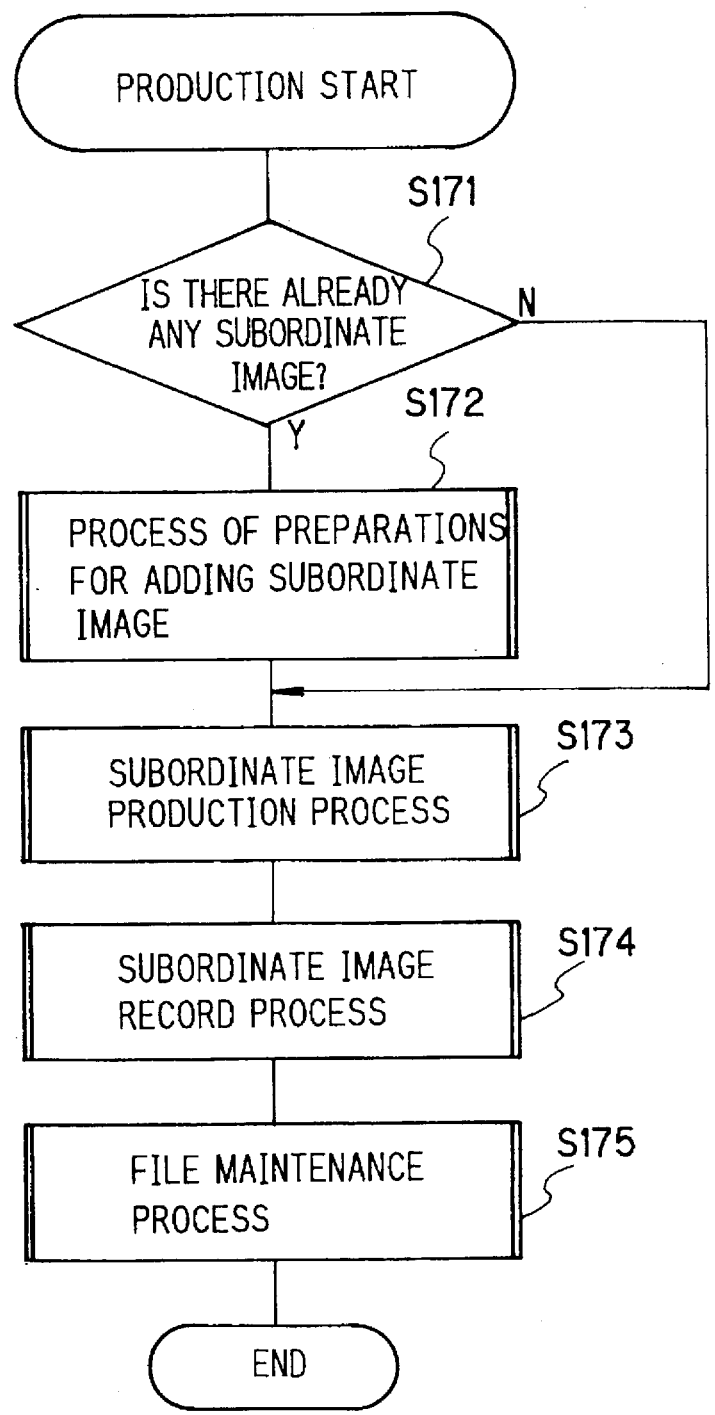
FIG. 33 shows a flow chart of the sequence of reproducing subordinate image.

FIG. 33 shows a flow chart of the sequence of reproducing a subordinate image. This sequence is an example under the assumption that the main image has already been reproduced and displayed for the subordinate image production. According to this embodiment, compared to the subordinate image production for the recording mode, it is possible to select a desired subordinate image while observing the main image without hurrying. Thus, more accurate subordinate image can be obtained.

In this case, with the start of the subordinate image production operation, a check is made as to whether there already is any subordinate image (step S171). If there is, a process of preparations for adding the subordinate image is executed (step S172). This preparation process includes preparations of the subordinate image data writing format, substituting of the subordinate image data into main image data, etc. If it is found in step S171 that there is no subordinate image, the routine skips steps S172 and proceeds to step 173. After execution of a subordinate image production process (step S173) and a subordinate image recording process (S174), a file maintenance process (step S175) is executed, thus bringing an end to the routine.

In the interval reproduction or multi reproduction, only the subordinate image may be reproduced, which is effective at the time of high speed reproduction retrieval. When there is no subordinate image, it is possible to execute skipping, muting, character displaying, etc.

Figure 34:
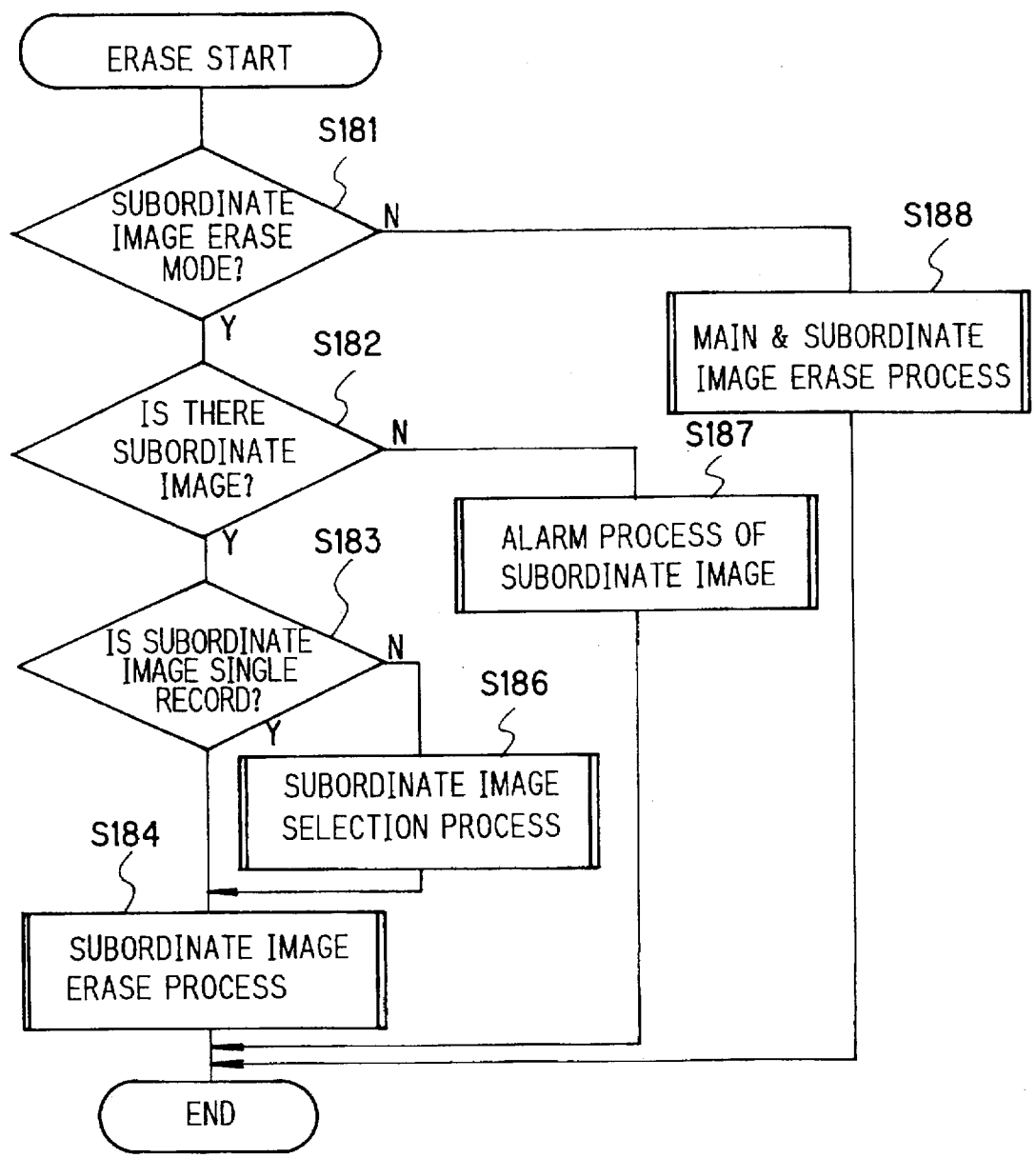
FIG. 34 shows a subordinate data erasing sequence.

Now, a subordinate data erasing sequence will be described with reference to the flow chart of FIG. 34.

When the erasing operation is started in response to an erasing command input or the like, a check is made as to whether there is a mode of erasing sole subordinate image (step S181). If so, whether there is a subordinate image is checked (step S132). If there is, a check is made as to whether the subordinate image consists of a single record (step S183). If so, the subordinate image is erased (step S184), thus bringing an end to the routine. Otherwise, a subordinate image selecting process for selecting and erasing one of a plurality of subordinate image records is executed (step S186), and then the process in step S184 is executed.

If it is determined that there is no subordinate image, an alarm indicative of the subordinate image is displayed on the monitor (step S18-7). If it is determined in step S181 that the mode is not one for erasing sole subordinate image, both the main and subordinate images are erased (step S188), thus bringing an end to the routine.

In the foregoing process, it is of course possible to erase solely the main image.

Figure 35:
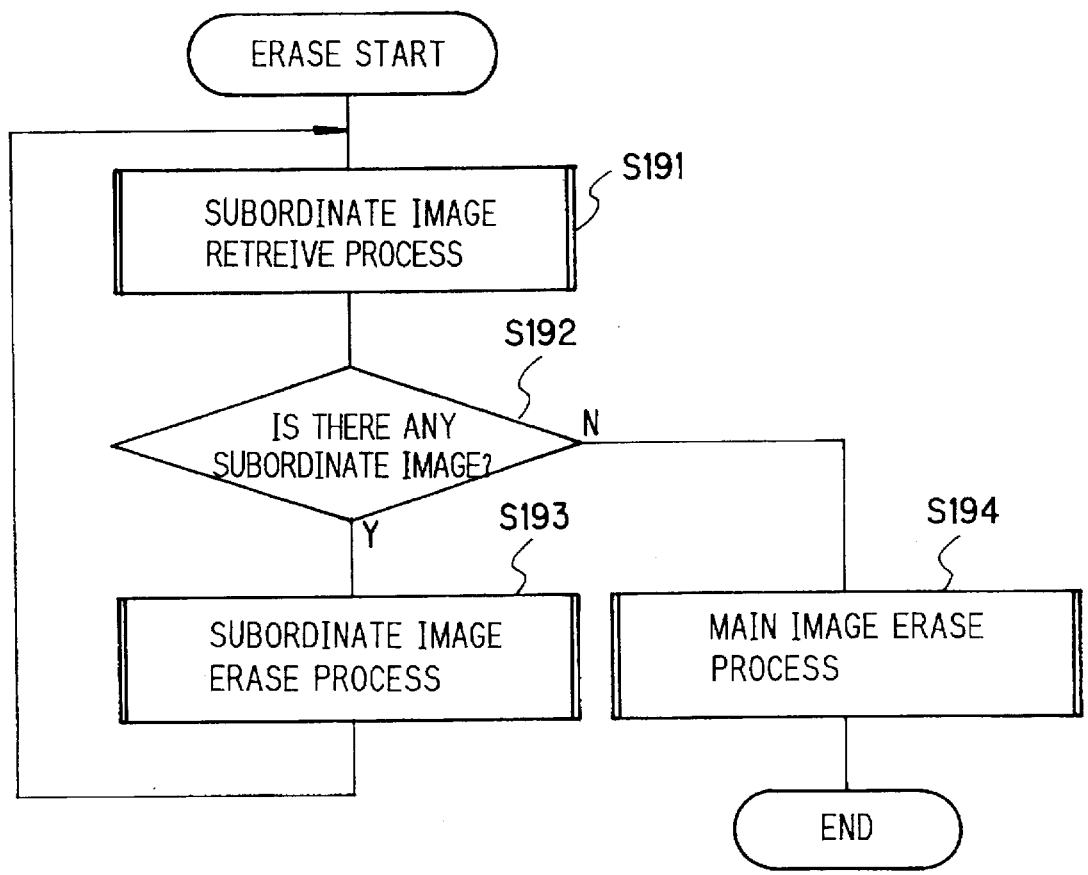
FIG. 35 shows a flow chart illustrating the sequence in an example of executing collective erasing when the subordinate image is written in a separate file.

FIG. 35 is a flow chart showing sequence in an example of executing collective erasing when the subordinate image is written in a separate file.

When the subordinate image is recorded in the collective file, simultaneous erasing of the collective file is possible. However, when the subordinate image is recorded in a separate file, a desire arises for erasing the subordinate image together with the erasing of the main image. This embodiment is a sequence for meeting this desire.

First, the subordinate image is retrieved. Specifically, a process of retrieving the subordinate image corresponding to the main image desired to be erased, is executed by using, for instance, the file header of the main image file, relational file, etc. (step S191). Then, whether there is any subordinate image is checked (step S192). If any, the subordinate image is erased (step S193), and the routine goes back to step S191. If it is determined in step S192 that there is no subordinate image, the main image is erased (step S194), thus bringing an end to the routine.

Now, an embodiment of the image processing apparatus will be described, in which the subordinate image data obtained in the above process is transmitted via a wired line such as a telephone line or a radio line.

Figure 36:
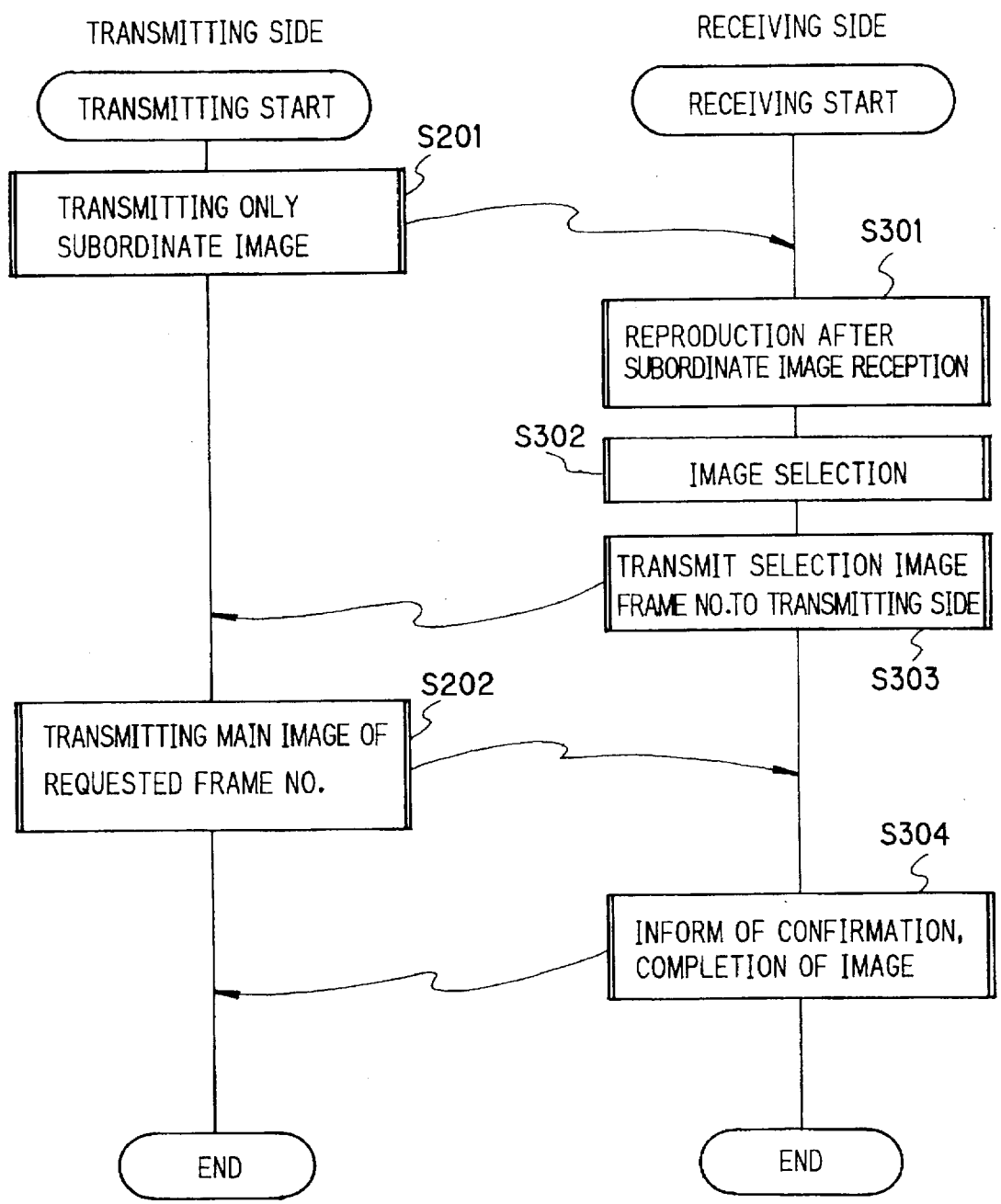
FIG. 36 shows a flow chart illustrating the procedure of transmitting the subordinate and main image data.

FIG. 36 is a flow chart showing the procedure of transmitting the subordinate and main image data. In this case, on the transmitting side, after the start of the transmitting operation only the subordinate image data is transmitted (step S201). On the receiving side, after receiving and reproducing the transmitted subordinate image data (step S301), a necessary image is selected (step S302), and designation data about the frame No., file name, etc. of the selected image is transmitted to the transmitting side (step S303).

Receiving the designation data, the transmitting side transmits the main image data of the designated frame No. to the receiving side (step S202). The receiving side receives, reproduces and confirms the designated main image data and then transmits an end signal indicative of the end of operation to the transmitting side (step S304), thus bringing an end to the routine.

Figure 37:
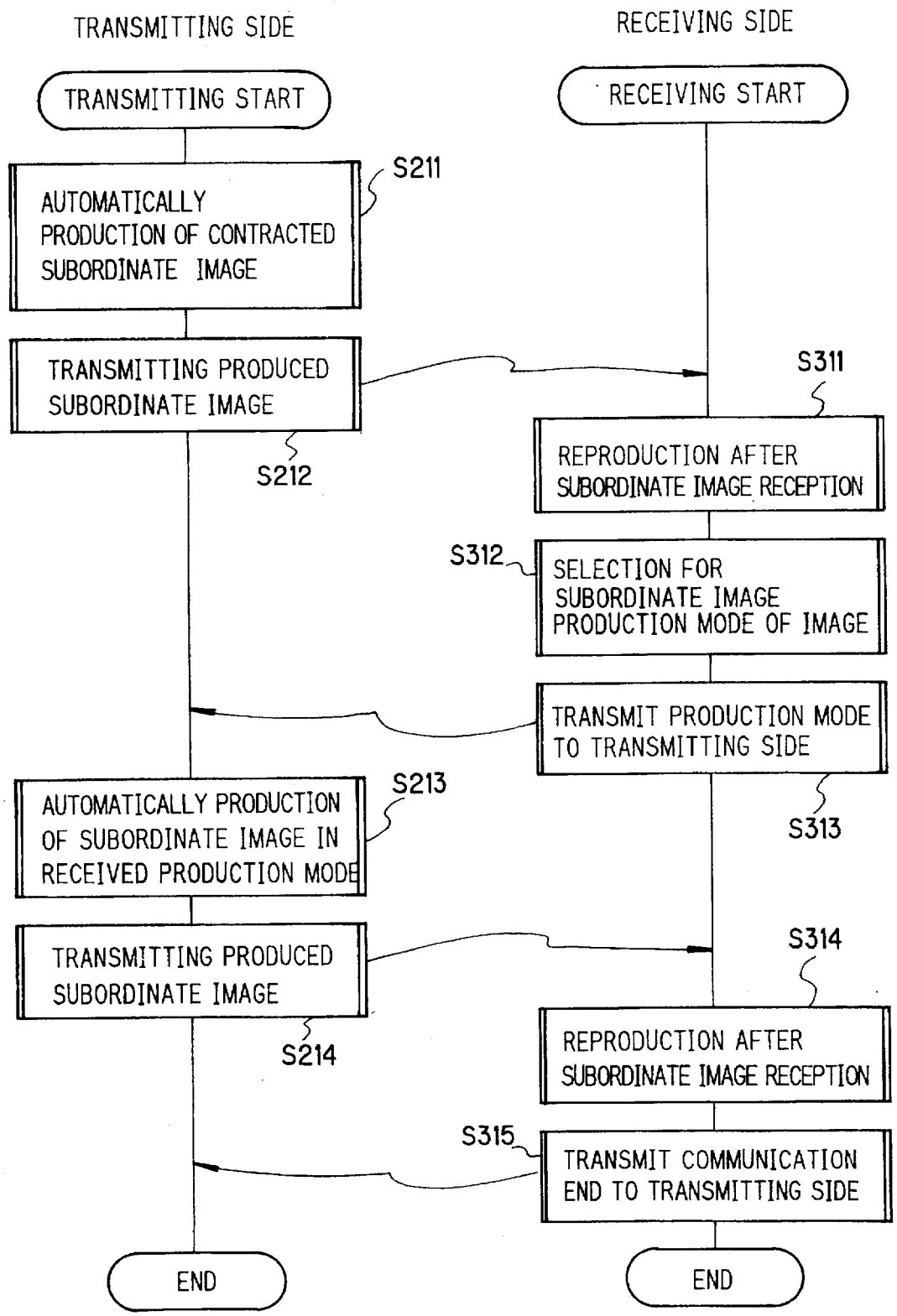
FIG. 37 shows a flow chart of an embodiment in which the subordinate image is automatically produced and transmitted in real time in response to a request from the receiving side.

FIG. 37 is a flow chart of an embodiment, in which the subordinate image is automatically produced and transmitted in real time in response to a request from the receiving side.

The transmitting side automatically produces the contracted subordinate image data (step S211), and transmits the produced subordinate image data (step S212). The receiving side receives and reproduces the transmitted subordinate image (step S311), then selects a subordinate image production mode (such as area selection) (step S312), and then transmits the selected mode to the transmitting side (step S313). The transmitting side automatically produces the subordinate image in the received mode (step S213), and transmits the produced subordinate image (step S214). The receiving side receives and reproduces the transmitted subordinate image (step S314), and transmits a communication end signal to the transmitting side (step S315), thus bringing an end to the routine.

Figure 38:
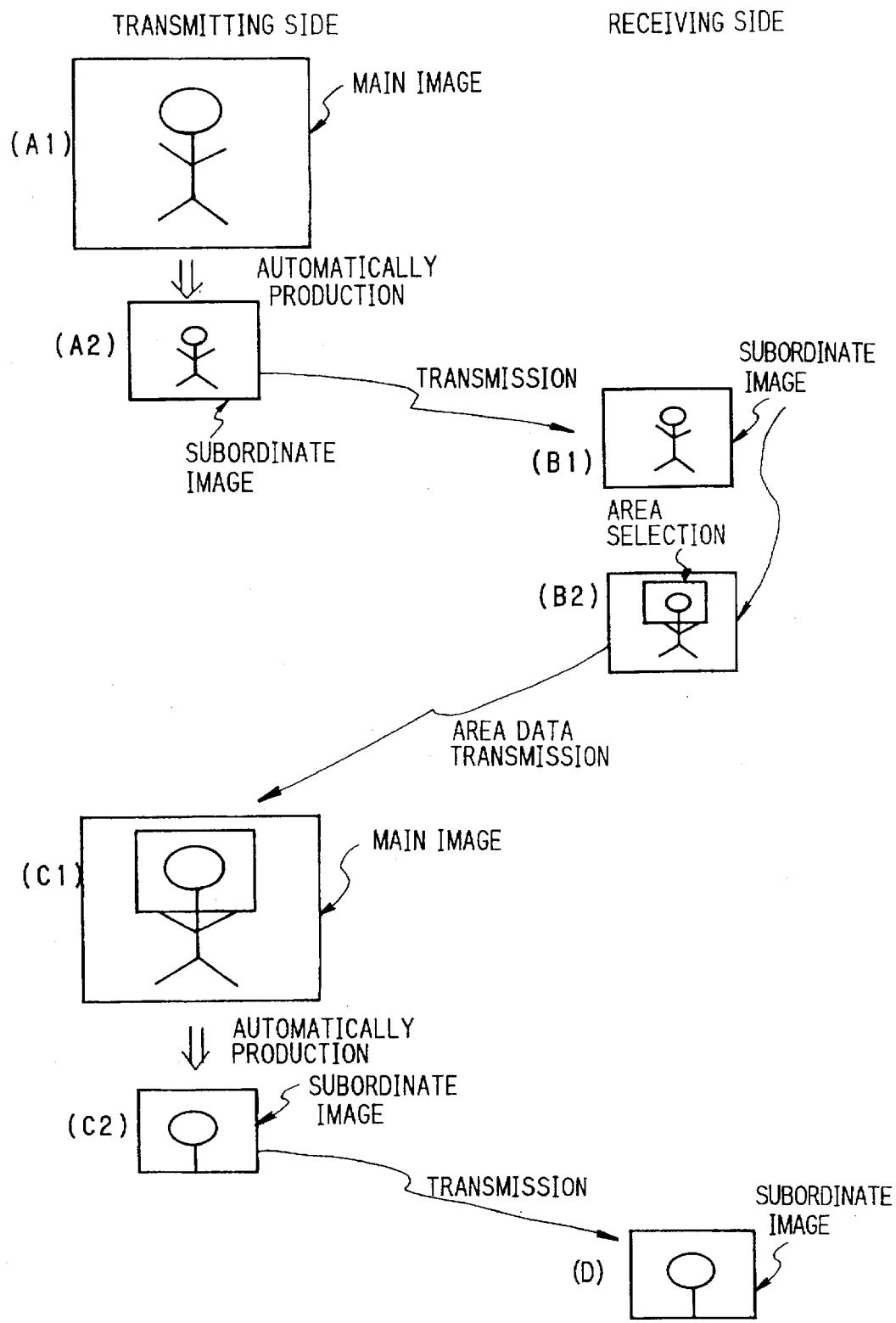
FIG. 38 shows a detail of the sequence of FIG. 37.

The sequence shown in FIG. 37 will now be described in further detail by also having reference to FIG. 38. The transmitting side automatically produces a contracted image A2 through thinning of the main image A1 and transmits the image A2 as the subordinate image (steps S211 and S212). The receiving side receives and reproduces this subordinate image, then selects a necessary area portion B2 through the area selection on the basis of the reproduced subordinate image B1, and then transmits the area selection data to the transmitting side (steps S311 to S313). The transmitting side automatically produces a subordinate image C2 with respect to the selected area of the main image C1 on the basis of the received area information and transmits the produced subordinate image C2 to the receiving side (steps S213 and S214). Finally, the receiving side reproduces the received subordinate image in conformity to request shown in (D), and transmits a communication end signal (steps S314 and S315), thus bringing an end to the routine.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. An image processing apparatus comprising:
    first subordinate image producing means for producing first subordinate image data by extracting part of a photographically obtained or externally supplied main image data of a predetermined image area,
    second subordinate image producing means for producing second subordinate image data by extracting part of the first subordinate image data produced by the first subordinate image producing means, and
    means for storing the main image data and the first and second subordinate image data in a same file.

2. The image processing apparatus of claim 1, said first and second subordinate image producing means each including area selecting means for selecting a particular area data of the main image data and first subordinate image date, respectively.

3. The image processing apparatus of claim 2, said area selection means including at least one of size changing means for changing the size of the particular area and area position changing means for changing the position of the particular area.

4. The image processing apparatus of claim 1, said first and second subordinate image producing means each including image contracting means for contracting the main image data and first subordinate image date part of the image data, respectively.

5. The image processing apparatus of claim 1, said first and second subordinate image producing means each including image compressing means for compressing the main image data and the first subordinate image date, respectively.

6. The image processing apparatus of claim 1, wherein:
said first subordinate image producing means including first area selecting means for making a particular area data of the main image part of the image data, or first image contracting means for making contracted image data obtained through contraction of the main image part of the image data; and
said second subordinate image producing means including at least one of second area selecting means for making a particular area data of the first subordinate image part of the image data, second image contracting means for making contracted image data obtained through contraction of the first subordinate image part of the image data, and image compressing means for making compressed image data obtained through contraction of data of the first subordinate image part of the image data.

7. The image processing apparatus of claim 6, said image compressing means including means for producing AC and DC orthogonal coefficients through orthogonal transform of image data, and producing the subordinate image data based on the sole DC orthogonal coefficients.

8. The image processing apparatus of claim 6, said image compressing means executing the compression by setting a constant data quantity after the compression.

9. The image processing apparatus of claim 6, said image compressing means executing the compression by setting a constant compression factor.

10. The image processing apparatus of claim 1, said first and second subordinate image producing means each including data format means for converting respectively produced subordinate image data into format data conforming to the format of a relevant computer.

* * * * *